(12) United States Patent
Enochs

(10) Patent No.: US 9,670,039 B1
(45) Date of Patent: Jun. 6, 2017

(54) PROJECTOR LIFT

(75) Inventor: Steven E. Enochs, New Palestine, IN (US)

(73) Assignee: Draper, Inc., Spiceland, IN (US)

( * ) Notice: Subject to any disclaimer, the term of this patent is extended or adjusted under 35 U.S.C. 154(b) by 0 days.

(21) Appl. No.: 13/487,998

(22) Filed: Jun. 4, 2012

Related U.S. Application Data

(60) Provisional application No. 61/493,401, filed on Jun. 3, 2011.

(51) Int. Cl.
| | | |
|---|---|---|
| *B66F 3/00* | (2006.01) | |
| *B66F 7/06* | (2006.01) | |
| *B66F 3/22* | (2006.01) | |
| *G03B 21/00* | (2006.01) | |

(52) U.S. Cl.
CPC .................. *B66F 3/00* (2013.01); *B66F 3/22* (2013.01); *B66F 7/065* (2013.01); *B66F 7/0666* (2013.01); *G03B 21/00* (2013.01)

(58) Field of Classification Search
CPC ........ G03B 21/54; G03B 21/00; F16M 11/04; F16M 11/10; F16M 11/12; F16M 13/02; F16M 13/027; B66F 3/22; B66F 7/0666; B66F 7/065; B66F 7/0616
USPC ........ 248/317, 320, 327, 328, 329; 254/267, 254/362; 182/98, 57; 187/211, 244
IPC ......................................... B66F 3/00,7/06, 3/22
See application file for complete search history.

(56) References Cited

U.S. PATENT DOCUMENTS

| | | |
|---|---|---|
| 936,681 A | 10/1909 | Union |
| 1,325,463 A | 12/1919 | Comstock |
| 1,473,263 A | 11/1923 | Urban |
| 1,498,813 A * | 6/1924 | Sankela ................... B66F 3/22 187/243 |
| 1,748,068 A | 2/1930 | Hood |
| 1,767,369 A | 6/1930 | Johnson |
| 1,819,516 A | 8/1931 | Kelly |
| 1,964,339 A | 6/1934 | Brassell |
| 2,435,755 A | 1/1948 | Schimpff |
| 2,933,198 A | 4/1960 | Firestone et al. |
| 3,032,308 A | 5/1962 | Hansen |
| 3,623,707 A | 11/1971 | Klopp |
| 3,666,127 A | 5/1972 | Guyaux |
| 3,672,104 A | 6/1972 | Luckey |
| 3,759,475 A | 9/1973 | Brown |
| 4,060,292 A | 11/1977 | Medina |
| 4,103,463 A | 8/1978 | Dixon |
| 4,159,162 A | 6/1979 | Christoffel |
| 4,313,208 A | 1/1982 | Kavenik |
| 4,412,601 A | 11/1983 | Cooper |
| 4,435,031 A | 3/1984 | Black et al. |
| 4,556,155 A | 12/1985 | Koppensteiner |
| 4,664,434 A | 5/1987 | Borst et al. |
| 4,684,164 A | 8/1987 | Durham |
| 4,830,147 A | 5/1989 | Kawada |
| 4,843,782 A | 7/1989 | Gustaveson et al. |

(Continued)

FOREIGN PATENT DOCUMENTS

| | | |
|---|---|---|
| EP | 0985612 | 3/1999 |
| KR | 2009019635 A * | 2/2009 |

OTHER PUBLICATIONS

Datalift, Data Projector Mounting System, Display Devices, Inc.; Received by PTO Jul. 31, 1989 2 pgs.

(Continued)

*Primary Examiner* — Muhammad Ijaz
(74) *Attorney, Agent, or Firm* — Faegre Baker Daniels LLP

(57) ABSTRACT

According to the present disclosure, a projector lift is provided to raise and lower a projector from the ceiling. The projector lift includes a ceiling mount normally coupled to the ceiling, a projector mount supporting the projector, a lift assembly configured to raise and lower the second mount and projector, and a stabilizer extending between the ceiling and projector mounts.

29 Claims, 17 Drawing Sheets

(56) References Cited

U.S. PATENT DOCUMENTS

| | | | |
|---|---|---|---|
| D302,618 S | 8/1989 | Gottelig | |
| 4,862,764 A | 9/1989 | Gehring | |
| D309,562 S | 7/1990 | Boscacci et al. | |
| 4,941,718 A | 7/1990 | Aleander, III et al. | |
| 5,113,972 A | 5/1992 | Haak, Sr. | |
| 5,120,054 A | 6/1992 | Wetzel | |
| 5,261,645 A | 11/1993 | Huffman | |
| 5,366,203 A * | 11/1994 | Huffman | E04B 9/003 248/277.1 |
| 5,379,977 A * | 1/1995 | Ronn | B66F 3/22 248/277.1 |
| 5,394,959 A | 3/1995 | Cullity et al. | |
| 5,487,524 A | 1/1996 | Bergetz | |
| 5,600,870 A | 2/1997 | Fields et al. | |
| 5,713,542 A | 2/1998 | Benoit | |
| D395,909 S | 7/1998 | Moss et al. | |
| 5,790,910 A | 8/1998 | Haskin | |
| 5,979,927 A | 11/1999 | Hale | |
| 6,345,799 B1 * | 2/2002 | Fusi | F16M 11/18 248/277.1 |
| 6,367,377 B1 | 4/2002 | Gawley et al. | |
| 6,427,858 B2 | 8/2002 | Sabounjian | |
| 6,484,993 B2 | 11/2002 | Huffman | |
| 6,516,478 B2 | 2/2003 | Cook et al. | |
| 6,637,711 B2 * | 10/2003 | Enochs | F21V 21/24 248/277.1 |
| 7,317,611 B2 | 1/2008 | Dittmer | |
| 7,631,848 B2 * | 12/2009 | Enochs | B66F 7/0666 248/277.1 |
| 2001/0050035 A1 | 12/2001 | Mahnken | |
| 2002/0092128 A1 | 7/2002 | Houk et al. | |
| 2002/0185637 A1 * | 12/2002 | Enochs | F21V 21/24 254/266 |
| 2005/0045428 A1 * | 3/2005 | Rennetaud | B66B 9/02 187/269 |
| 2007/0246618 A1 * | 10/2007 | Choi | F16M 11/18 248/125.2 |
| 2009/0134592 A1 * | 5/2009 | Hansson | B60G 21/0551 280/124.106 |
| 2010/0213338 A1 | 8/2010 | Enochs | |

OTHER PUBLICATIONS

SVS, Inc., Lift Features and Benefits, Product Listing, Warranty Information, Architectural Specifications, and Environmental Stability; http://www.svslifts.com/arch.htm; Feb. 8, 2001; 5 pgs.

SVS Inc., About SVS Lift Systems, Product Listing, What are the Advantages of Purchasing an SVS Lift?, Lift Features and Benefits, Lift Accessories; webmaster@svslifts.com; © 1997-1999 SVS, Inc.; 8 pgs.

Display Devices Inc., Taking projection to new heights; © 2000, Display Devices Inc., Revised: Jan. 2001; 1 pg.

Display Devices Inc., Taking Projection to New Heights, DataLite DataLift DataWide Specification; www.displaydevices.com; date unknown; 5 pgs.

Display Devices Inc., Taking Projection to New Heights, DataLite DataLift Datawide, Installation & Owners' Manual; www.displaydevices.com; Dec. 15, 2000; 13 pgs.

SVS Mini 4 Projector Lift Series, SVS 4 Projector Lift Series; SVS Inc.; date unknown; 1 pg.

SVC LCD-1 Lift; SVS, Inc.; date unknown; 1 pg.

MAGNA-LIFT; Electric ServiceLift for LCD, DLP and Data Projectors; http//www.chiefmfg.com/magnalift.html; Feb. 6, 20001; 3 pgs.

MAGNA LCD/DLP Electric Ceiling Lifts; http://www.chiefmfg.com/magnalcddlp.html; Feb. 6, 2001; 8 pgs.

36" SMART-LIFT Electric Ceiling Lifts, Instruction Manual, Install the Projector on the Lift; pp. 8-13; date unknown; 8 pgs.

Instruction Manual, 36" SMART-LIFT™ Electric Ceiling Lift; Chief Manufacturing Inc.; Part No. 8820-000002 (Rev A); © 2000 Chief Manufacturing; Nov. 2000; 3 pgs.

Smart-Lift; Full-Line / Chief; http//www.chiefmfg.com/smartlift.html; Feb. 6, 2001; 1 pg.

Our Catalogue, Screen/Accessories, www.oray.fr/english/catalogue accessories.html; date unknown; 4 pgs.

ElectraMount, The Video Projector Protector; by Draper; 1999; 4 pgs.

UniMount, UniMount Specifications; Video Projector Mount With Unibody Construction; by Draper; 1999; 4 pgs.

LCD Mount, Compact, lightweight mount fits most LCD projectors; LCD Mount Specifications; by Draper; © 1999; 2 pgs.

Scissor Lift; Scissor Lift Planning Sheet for SL and SLX Series; by Draper; © 1998; 5 pgs.

SVS 12 EX Lift Installation Instructions (110V); SVS, Inc., Lifting Your Image; www.syslifts.com; 16 pgs.

SVS 12 HSE Series Projector Lifts; Lift Height Chart; Release Date May 1998; www.svslifts.com; 1 pg.

SVS Accessory #13 Removable Platform; Release Date Feb. 16, 2006; www.svslifts.com; 1 pg.

SVS TL1 Lift Installation Instructions (110V); SVS, Inc., Lifting Your Image; www.svslifts.com; 16 pgs.

* cited by examiner

PROJECTOR LIFT

RELATED APPLICATION

This application claims the benefit of U.S. Provisional Patent Application Ser. No. 61/493,401, filed Jun. 3, 2011, entitled PROJECTOR LIFT, to Enochs, the entire disclosure of which is expressly incorporated by reference herein.

BACKGROUND OF THE INVENTION

This invention relates to devices configured to lower a projector from a ceiling. More particularly, the present invention relates to devices having scissor mechanisms configured to stabilize such a projector.

Video projectors are often hung or supported from the ceiling to project an image onto a movie screen or other surface. Projector lifts are provided to raise and lower the projector from the ceiling. Examples of such projector lifts are provided in U.S. Pat. No. 5,366,203; U.S. Design Pat. No. 395,909; and U.S. Pat. No. 7,631,848, the disclosure of which and all other patent documents mentioned herein are expressly incorporated by reference herein.

Additional features of the disclosure will become apparent to those skilled in the art upon consideration of the following detailed description when taken in conjunction with the accompanying drawings.

BRIEF DESCRIPTION OF THE DRAWINGS

A detailed description particularly refers to the accompanying figures in which.

DETAILED DESCRIPTION OF THE DRAWINGS

Figure 1:
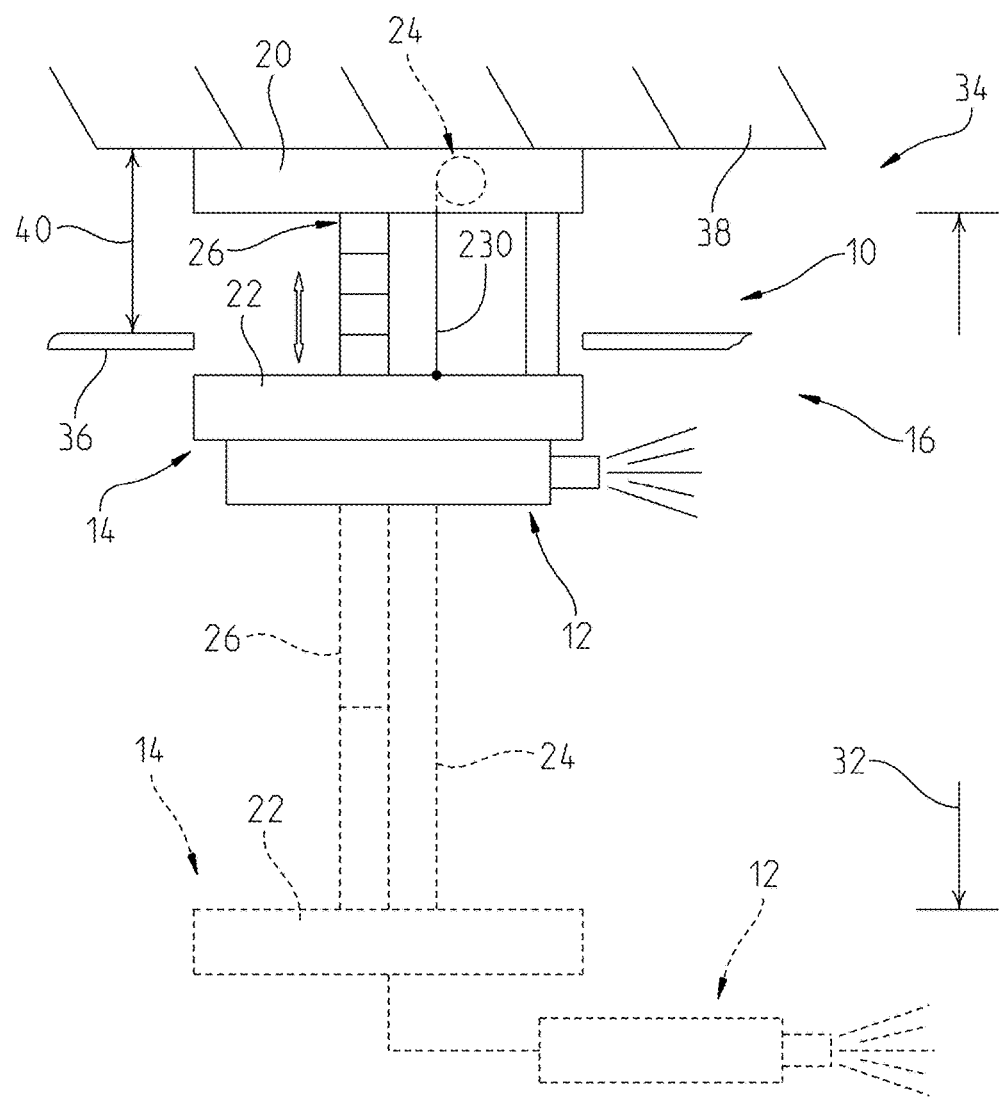
FIG. 1 is a diagrammatic view of a projector lift.

An audio/visual system 10 in accordance with the present disclosure is shown in FIG. 1. System 10 includes a projector 12 and a projector lift 14. Lift 14 is configured to move projector 12 from a storage position to a use position where projector 12 shines an image on a projection screen (not shown) or other surface.

When in the storage position, lift 14 and projector 12 are preferably concealed in a ceiling 16 of a structure, such as a conference room. Thus, when projector 12 is not in use, it is tucked up in ceiling 16 and not visible so that the aesthetic qualities of the room are maintained. To use projector 12, lift 14 lowers projector 12 into the room so that the image can be shown on the projection screen.

As shown in FIG. 1, lift 14 includes a ceiling mount 20 coupled to ceiling 16 of the structure and a projector mount 22 supporting projector 12. Lift 14 further includes a lift assembly 24 that raises and lower projector mount 22 and projector 12 relative to ceiling mount 20 and ceiling 16. Lift 14 further includes one or more stabilizers 26 that stabilize projector mount 22 during raising, lowering, and/or operation of projector 12.

Figure 2:
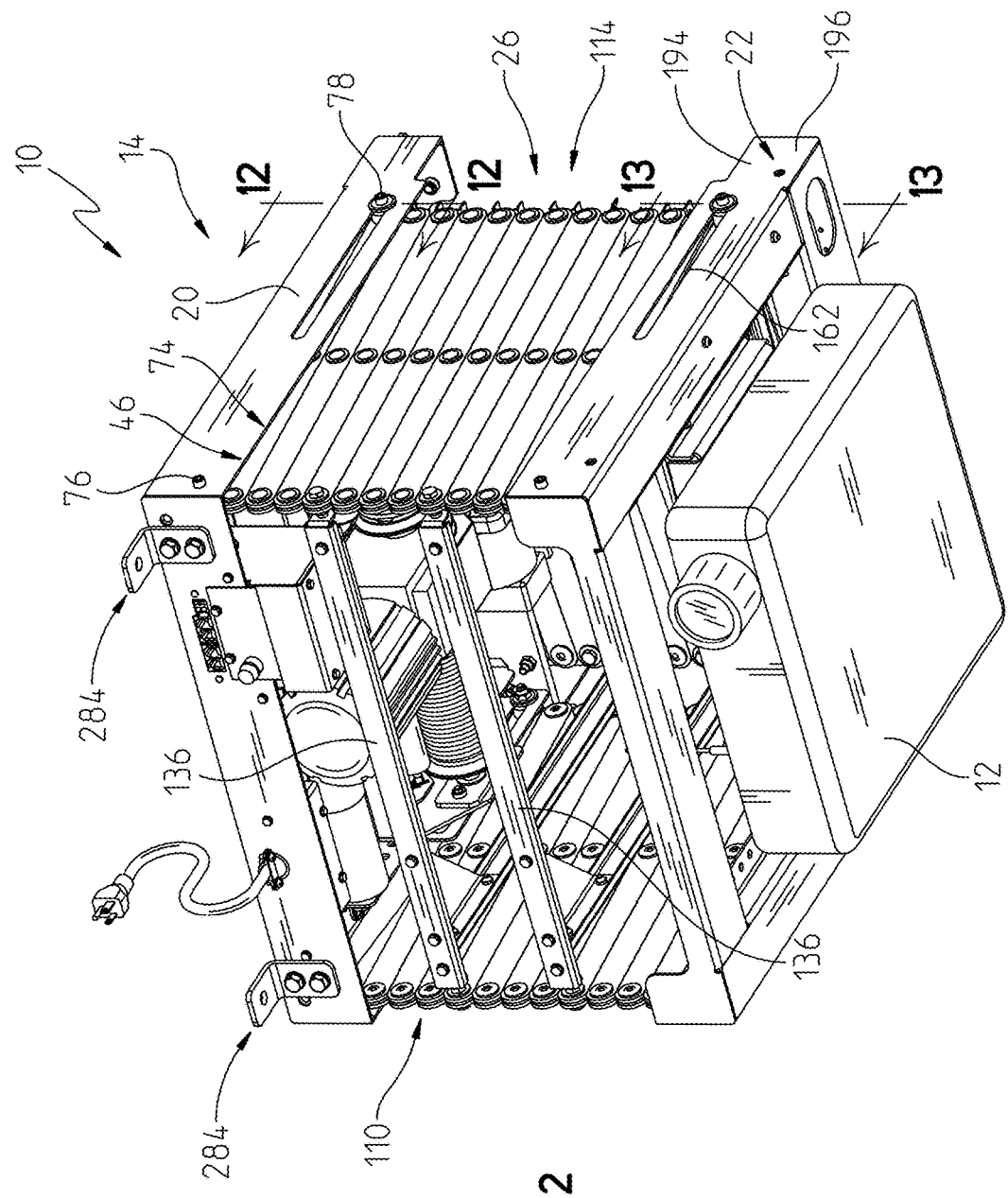
FIG. 2 is a perspective view of the projector lift supporting a projector showing the projector lift including a ceiling mount adapted to be coupled to the ceiling, a projector mount supporting the projector, three extendable stabilizers (one partially obstructed by other components) extending between the ceiling and projector mounts, and a lift assembly also extending between the ceiling and projector mounts to raise and lower the projector mount and the projector coupled thereto.

The overall length of stabilizer 26 changes as projector 12 is raised and lowered by lift assembly. For example, when projector 12 is in the storage position, stabilizer 26 had a retracted length 28, as shown in FIG. 2, and when projector 12 is in the use position, stabilizer 26 has an extended length 30, as shown in FIG. 3, that is greater than retracted length 28.

Lift 14 is preferably configured to lower projector 12 to a service position where it is convenient to add or remove projector 12 from projector mount 22 for installation, service, or replacement. The service position, shown in phantom in FIG. 1, is below the use position so that a service technician can install, service, or remove projector 12 while standing on the floor. To permit projector 12 to be lowered for servicing, stabilizer 26 must extend beyond length 30 to a further extended service length 32 permitting a technician to install, remove, and/or repair projector 14.

Figure 3:
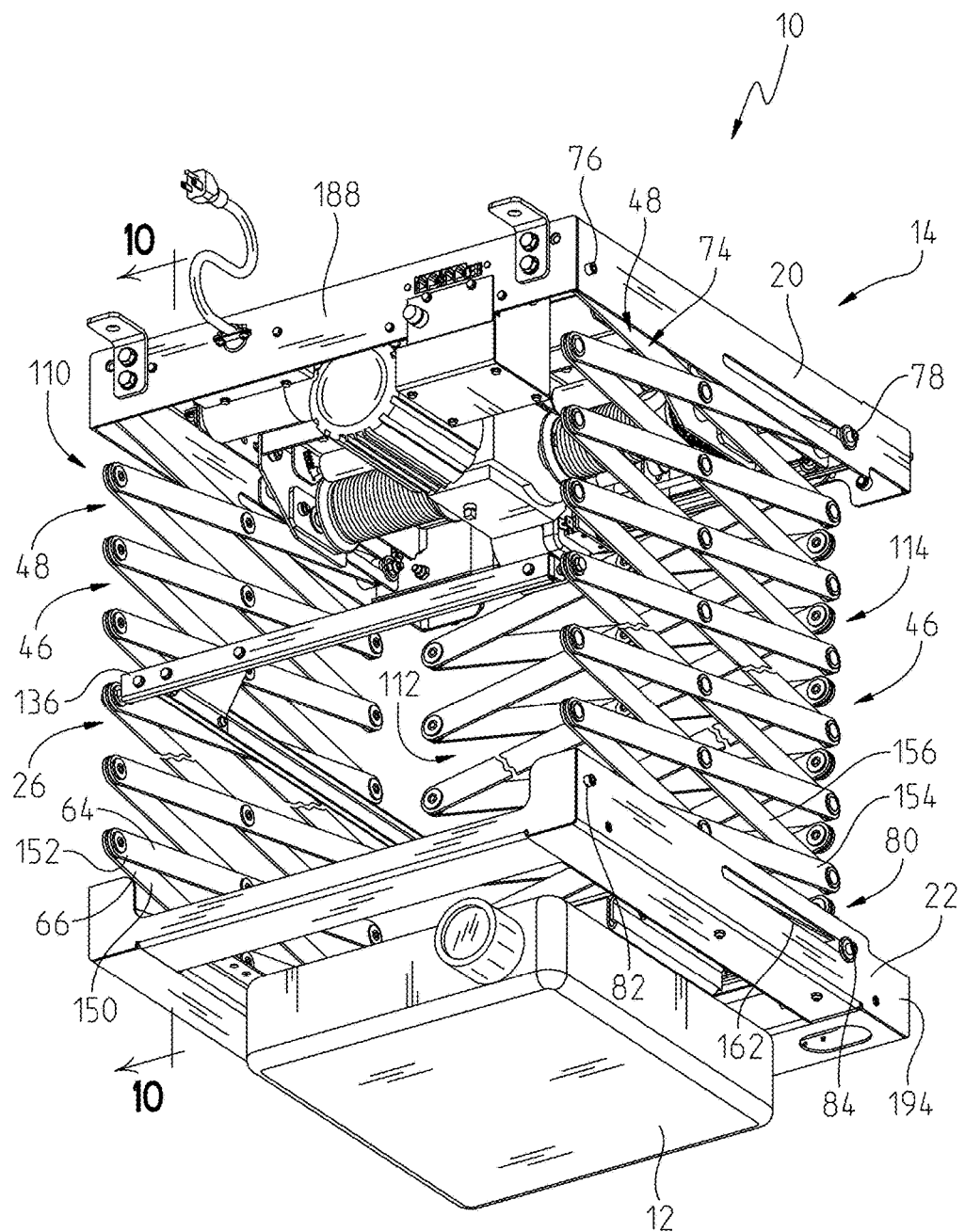
FIG. 3 is a perspective view similar to FIG. 2 showing the projector mount lowered by the lift assembly with the stabilizers in an extended position.

As shown in FIG. 3, each stabilizer 26 includes a scissor link series 46 of scissor link pairs 48. Each respective scissor pair 48 extends or is oriented between ceiling mount 20 and projector mount 22. According to alternative embodiments of the present disclosure, other extension units such as telescoping members (tubes, sliding plates, etc.), side-by-side scissor pairs (see, for example, U.S. Pat. No. 7,631,848), rigid bellows, or other extension units known to those of ordinary skill in the art are used.

Preferably, each scissor pair 48 includes a first link 64 and a second link 66 coupled to respective first link 64 by a pair coupler 68 at a pivot location 70 to pivot about a pivot axis. As shown in FIG. 2, preferably, each first link 64 is positioned adjacent to respective second link 66 of the same scissor pair 48. (Reference to components as first, second, third, etc. is used to provide a convenient reference to otherwise similar or identical components, but is not intended to limit those components to a specific sequence or location). First and second links 64, 66 of a first pair 74 are preferably coupled to ceiling mount 20 by respective ceiling mount couplers 76, 78. Similarly, first and second links 64, 66 of a seventh or last pair 80 are preferably coupled to projector mount 22 by respective projector mount couplers 82, 84.

Figure 7:
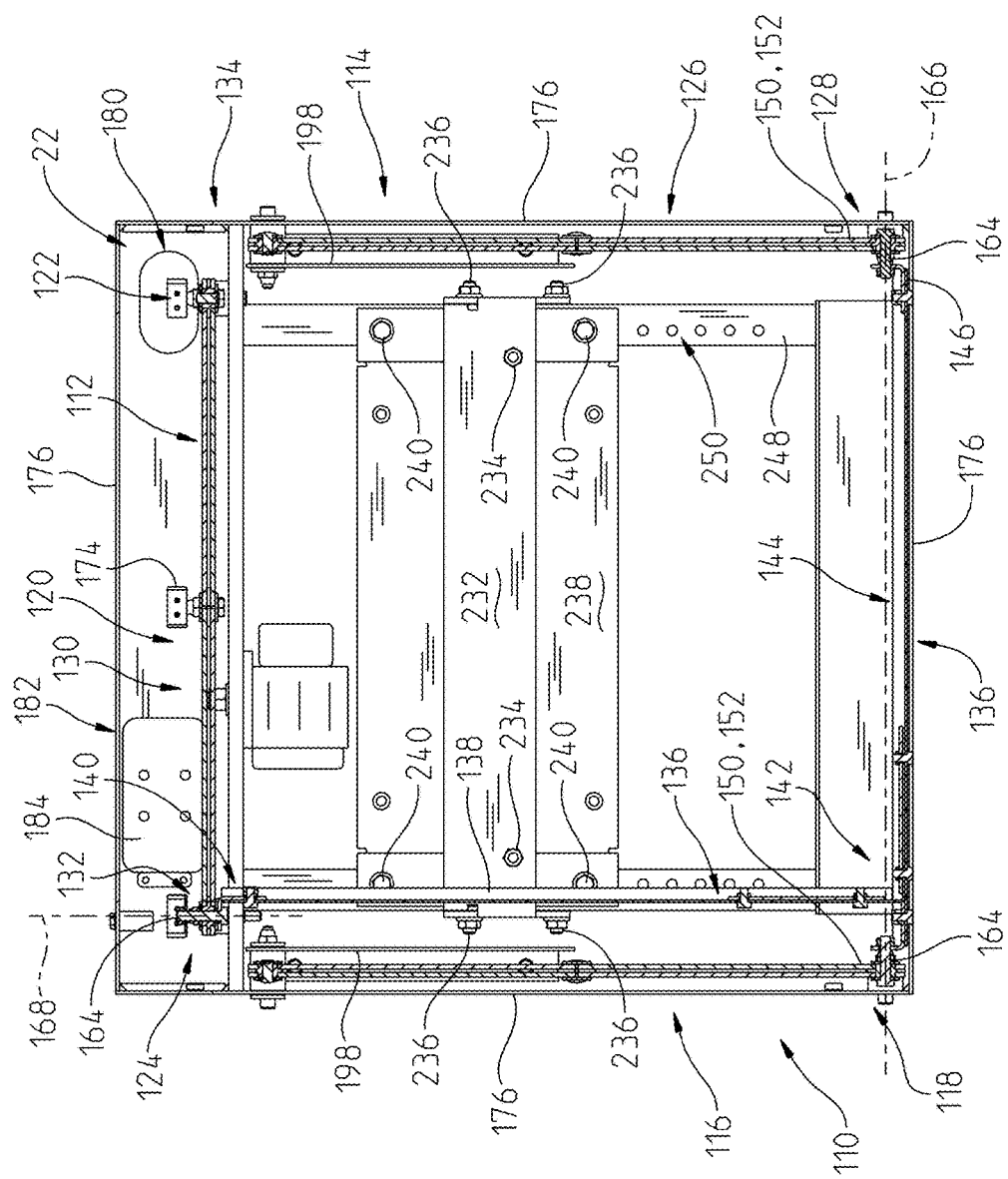
FIG. 7 is a is a cross-sectional view taken along line 7-7 of FIG. 6.

According to the present disclosure, stabilizers 26 include first, second, and third stabilizers 110, 112, 114. First and third stabilizers 110, 114 and substantially parallel to each other and substantially non-parallel to second stabilizer, preferably perpendicular. As shown in FIG. 7, the non-parallel relationship between first and second stabilizers 110, 112 (and second and third stabilizers 112, 114) creates an approximate L-shape having a first leg 116 having a terminal end 118, a second leg 120 having a terminal end 122, and a corner 124 spaced apart from terminal ends 118, 122. The non-parallel relationship between second and third stabilizers 112, 114 also creates an approximate L-shape having a first leg 126 having a terminal end 128, a second leg 130 having a terminal end 132, and a corner 134 spaced apart from terminal ends 128, 132. Similarly, the relationship between first, second, and third stabilizers 110, 112, 114 creates a U-shape.

L-shaped stabilizer links 136 are provided that couple first, second, and third stabilizers 110, 112, 114 together as shown in FIGS. 2-4 and 6. Each stabilizer link 136 is coupled to each stabilizer 110, 112, 114. Thus, each stabilizer link 136 couples parallel and non-parallel stabilizers 110, 112, 114 together.

Figure 6:
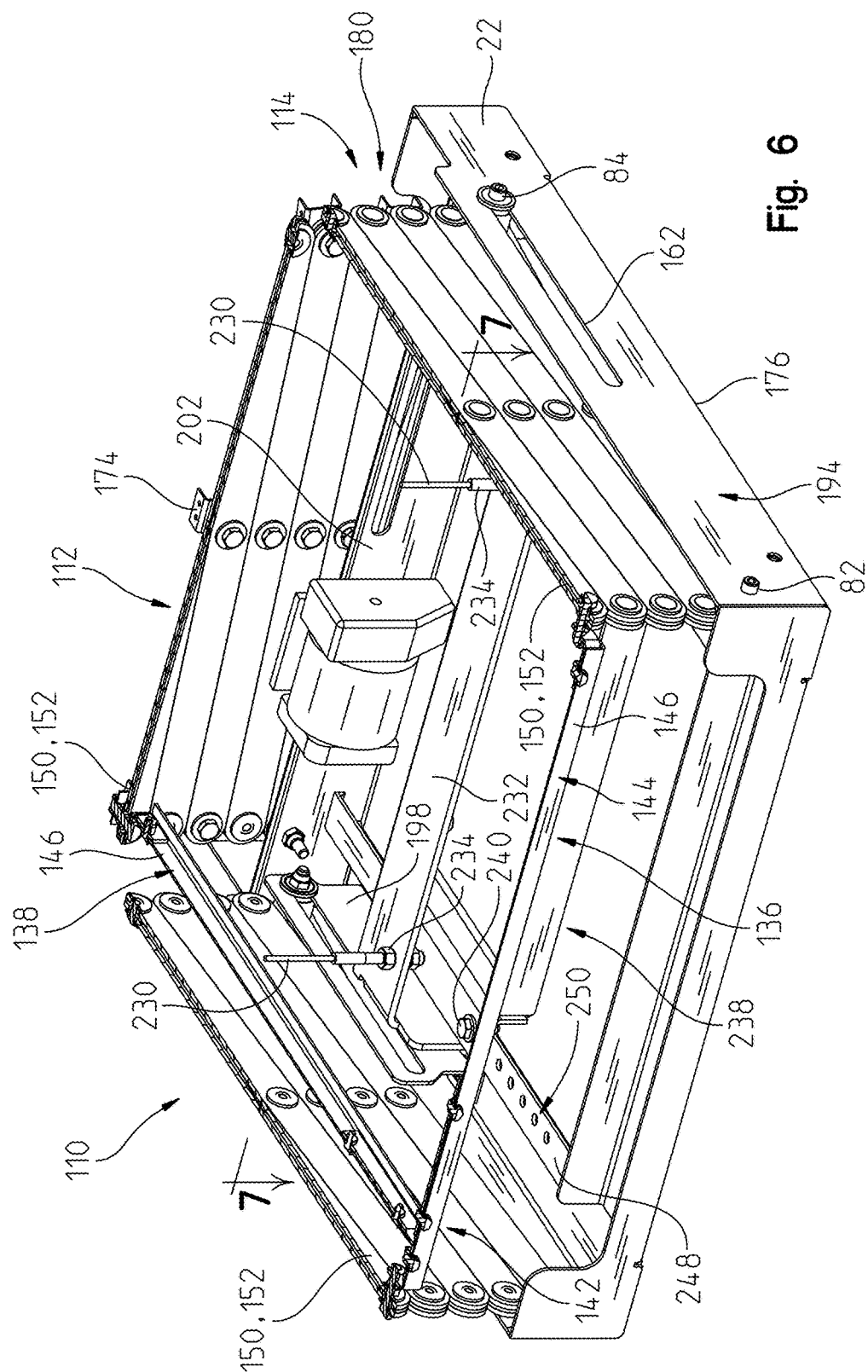
FIG. 6 is another perspective view of the projector lift of FIG. 2 showing an upper portion of the projector lift removed and an L-shaped link extending between the three extendable stabilizers.

As shown in FIG. 6, stabilizer link 136 includes a first leg 138 having a terminal end 140, a corner 142, and second leg 144 having a terminal end 146. First leg 138 itself is a stabilizer link between first and second stabilizers 110, 112; second leg 144 itself if a stabilizer link between first and third stabilizers 110, 114, and first and second legs 138, 144 form a stabilizer link between second and third stabilizers 112, 114. Leg/link 138 is substantially parallel to first and third stabilizers 110, 114 and substantially non-parallel, preferably perpendicular, to second stabilizer 112. Similarly, leg/link 144 is substantially parallel to second stabilizer 112 and substantially non-parallel, preferably perpendicular, to first and third stabilizers 110, 114.

Figure 8:
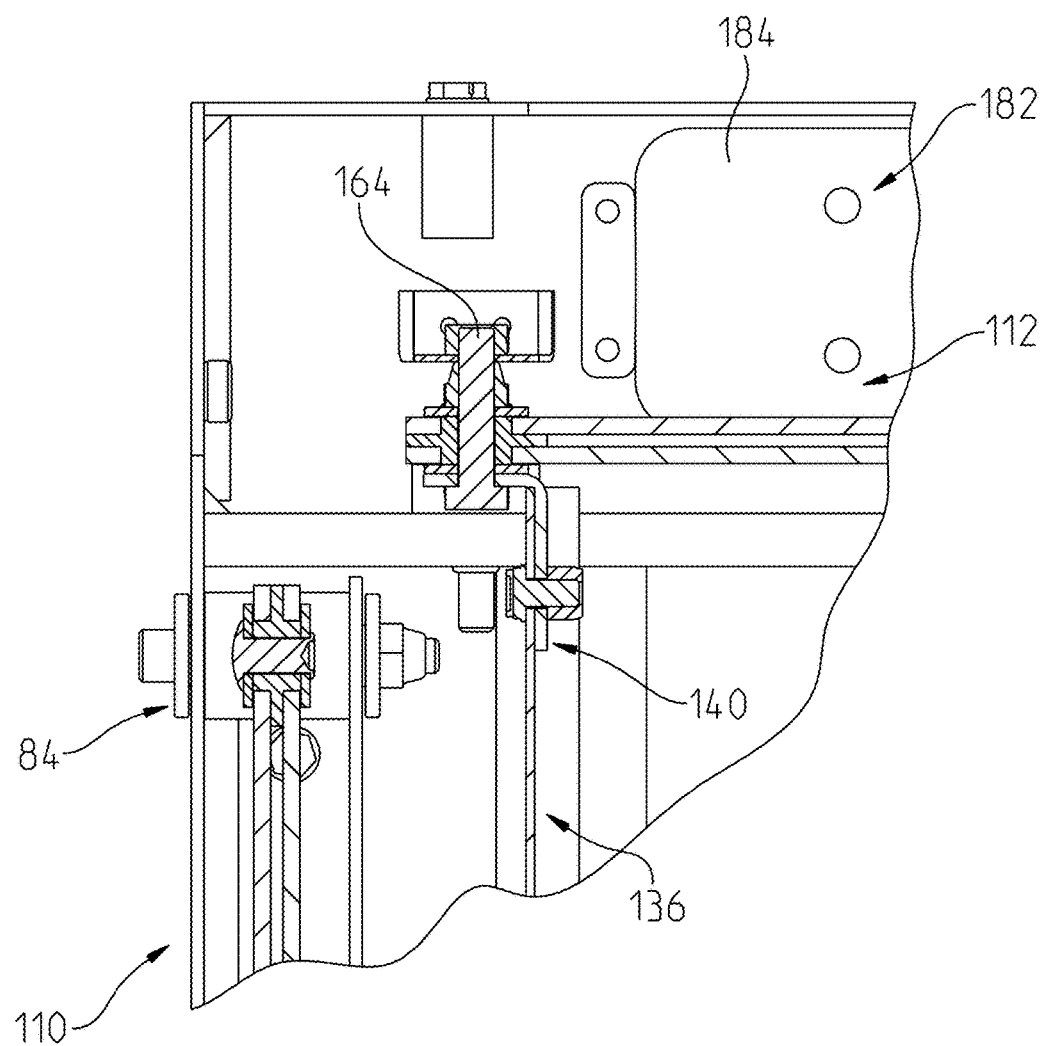
FIG. 8 is an enlarged view of a portion of FIG. 7.

Preferably, as shown in FIG. 7, stabilizer link 136 is coupled to second stabilizer 112 at corner 124 of the L-shaped defined by first and second stabilizers 110, 112 and coupled to first stabilizer 110 at terminal end 118 of first leg 116 of the L-shape. Similarly, as shown in FIG. 8, stabilizer link 136 is coupled to second stabilizer 112 at terminal end 128 of first leg 126 of the L-shaped defined by second and third stabilizers 112, 114 and coupled to terminal end 132 of second leg 130 of this L-shape as shown in FIG. 6.

Figure 10:
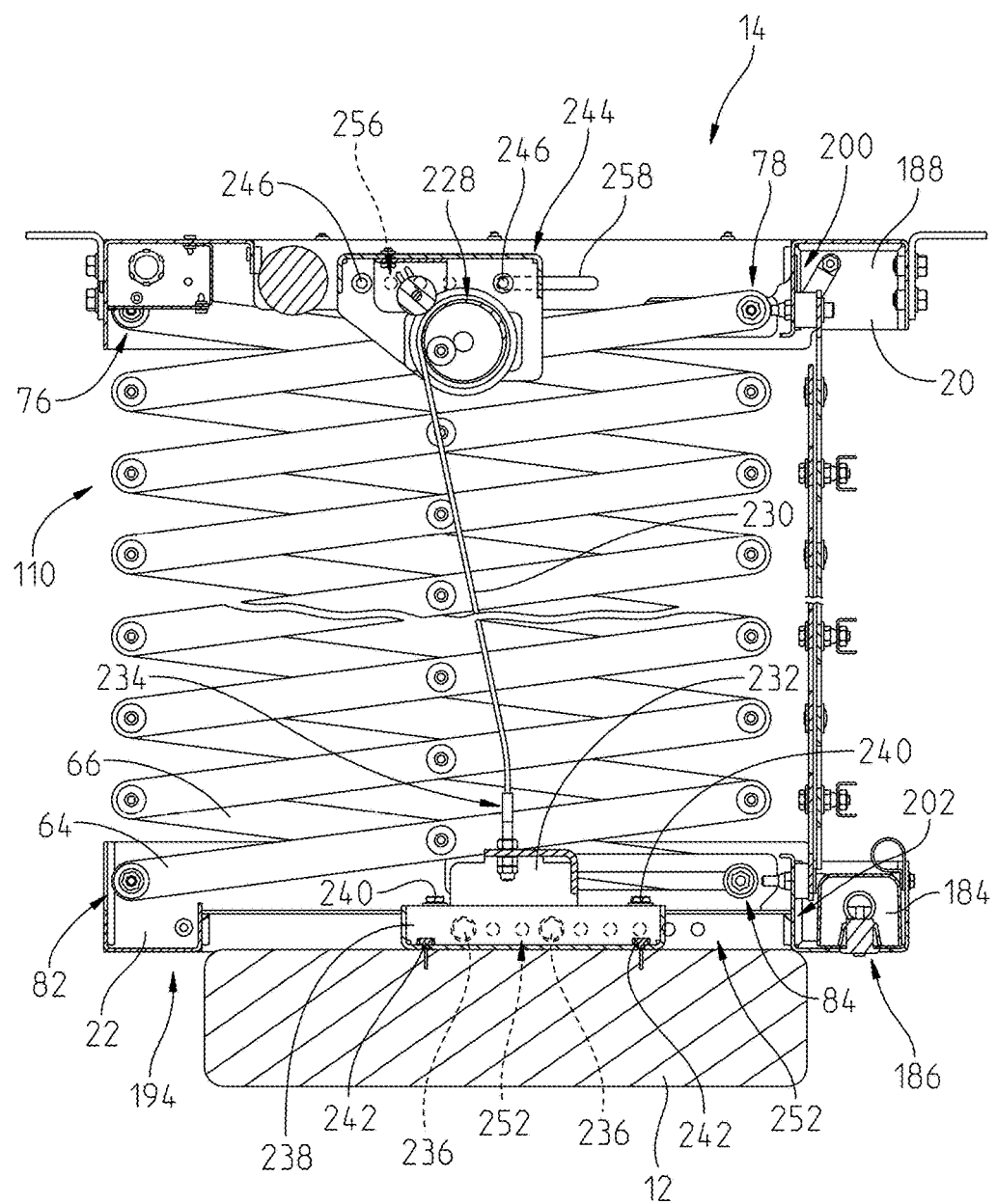
FIG. 10 is a cross-sectional view taken along line 10-10 of FIG. 3 showing the projector mount in a lowered position.

During extension and retraction of stabilizers 110, 112, 114, terminal ends 150, 152 of first and second scissor links 64, 66 maintain the substantially the same horizontal position while opposite terminal ends 154, 156 move in a horizontal direction. For example as shown in FIG. 10, terminal end 150 of first scissor link 64 is coupled to projector mount 22 by coupler 82 to remain horizontally stationary and terminal end 156 of second scissor link 66 is coupled to projector mount 22 by coupler 84 that slides in slot 162 to allow movement of terminal end 156 along slot 162 in a horizontal direction. During raising and lowering of stabilizers 110, 112, 114, terminal ends 150, 152 of the other scissor links in each stabilizer 110, 112, 114 remain generally directly above terminal end 150 of first scissor link 64 coupled to projector mount 22 by coupler 22. Similarly, during raising and lowering of stabilizers 110, 112, 114, terminal ends 154, 156 of the other scissor links in each stabilizer 110, 112, 114 remain generally directly above terminal end 154 of second scissor link 66 that slides along slot 162 so that these terminal ends 154, 156 also move in a horizontal direction to move from a first horizontal position to a second horizontal position. Because first and third stabilizers 110, 114 are perpendicular to second stabilizer 112, the direction of the horizontal movement of ends 154, 156 of first and third stabilizers 110, 114 is perpendicular to the direction of the horizontal movement of ends 154, 156 of second stabilizer 112.

Stabilizer links 136 are preferably coupled to terminal ends 150, 152 of either first and second links 64, 66 so they remain in substantially the same horizontal position during extension and retraction of stabilizers 110, 112, 114. Thus, while raising and lowering with the portions of stabilizers 110, 112, 114 to which they are coupled, stabilizers links 136 remain substantially horizontally stationary so that the horizontal positions of ends 140, 146 and corner 142 of stabilizer links 136 remains substantially constant.

During extension and retraction of stabilizers 110, 112, 114, the angles of first and second scissor link 64, 66 relative to each other and to horizontal change. For example, first and second scissor links 64, 66, are closer to horizontal when retracted than when extended. During extension and retraction of stabilizers 110, 112, 114, stabilizer links 136 remain substantially horizontal. Thus, during extension and retraction of stabilizers 110, 112, 114, the angles between first and second scissor links 64, 66 change relative to stabilizer link 136 including legs 138, 140.

Stabilizer links 136 are coupled to first, second, and third stabilizers 110, 112, 114 by couplers 164 that extend through first and second links 64, 66 as shown in FIG. 7. Couplers 164 allow links 136 to rotate about axis of rotation 166 relative to first and third stabilizers 110, 112 and to rotate about axis of rotation 168 relative second stabilizer 112. Terminal ends 150, 152 of respective scissor links 64, 66 of first and third stabilizers 110, 114 also rotate about pivot axis 166, which is substantially non-parallel to, preferably perpendicular to, axis of rotation 168. Similarly, terminal ends 150, 152 of respective of second stabilizer 112 also rotates about pivot axis 168, which is substantially non-parallel to, preferably perpendicular to, axis of rotation 166. On occasion, portions of second stabilizer 112 will not raise or lower at the same rate as corresponding portions of first and third stabilizers 110, 114. By allowing rotation of stabilizer link 136 about axis of rotation 166, stabilizer links 136 are less restrictive of this disparity in the rate of raising and lowering. Similarly, portions of first stabilizer 110 will not raise or lower at the same rate as corresponding portions of third stabilizer 114. By allowing rotation of stabilizer link 136 about axis of rotation 168, stabilizer links 136 are less restrictive of this disparity in the rate of raising and lowering.

Figure 5:
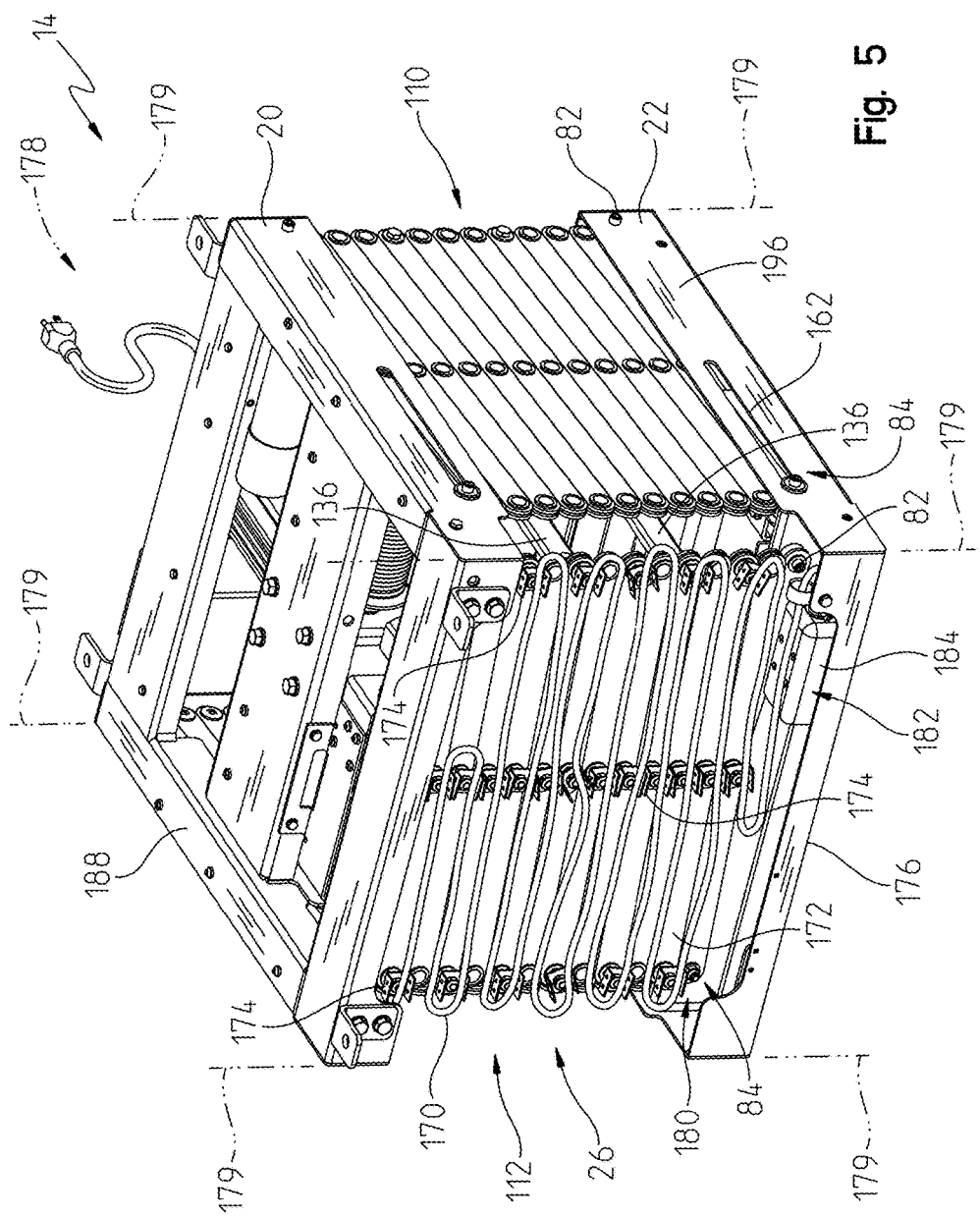
FIG. 5 is another perspective view of the projector lift of FIG. 2 showing a cable extending along one of the extendable stabilizers.

As shown in FIG. 5, a cable 170 is provided that extend from ceiling mount 20 to projector 12 supported on projector mount 22 to power and/or control the operation of projector 12 or other audio/visual component. According to the preferred embodiment of the present disclosure, cable 170 extends along outwardly facing surfaces 172 of scissor links 64, 66. According to an alternative embodiment of the present disclosure, cable 170 extends along the inwardly facing surfaces of scissor links 64, 66 opposite outwardly facing surfaces 172. Second stabilizer 112 includes a plurality of cable receiving brackets 174 coupled to first and second scissor links 64, 66.

Projector mount 22 has an exterior footprint having an outer perimeter 176 that defines a vertical column of space 178 having a vertical boundary 179. First, second, and third stabilizers 110, 112, 114 and cable 170 are positioned within this vertical column of space 178 regardless of whether or not cable 170 is positioned along outwardly facing surfaces 172 or the opposite inwardly facing surfaces. To facilitate the placement of cable 170 on outwardly facing surfaces 172 of links 64, 66 of second stabilizer 112, second stabilizer 112 inset further away from outer perimeter 176 than, for example, first and third stabilizers 110, 114. This provides a space 180 between outwardly facing surfaces 172 and the adjacent side of vertical column of space 178 to provide room for cable 170, cable brackets 174, and electrical outlet 182, discussed below. As a result of this placement, a majority, if not all, of cable 170 supported by projector lift 14 is positioned within vertical column of space 178.

As shown in FIG. 5, electrical outlet 182 is positioned between at least one of first and second links 64, 66 and outer perimeter 176 of projector mount 22. Electrical outlet 182 includes a junction box 184 and a three prong electrical receptacle 186 shown in FIG. 11. According to alternative embodiments, additional electrical, signal, and other receptacles may be provided.

Figure 12:
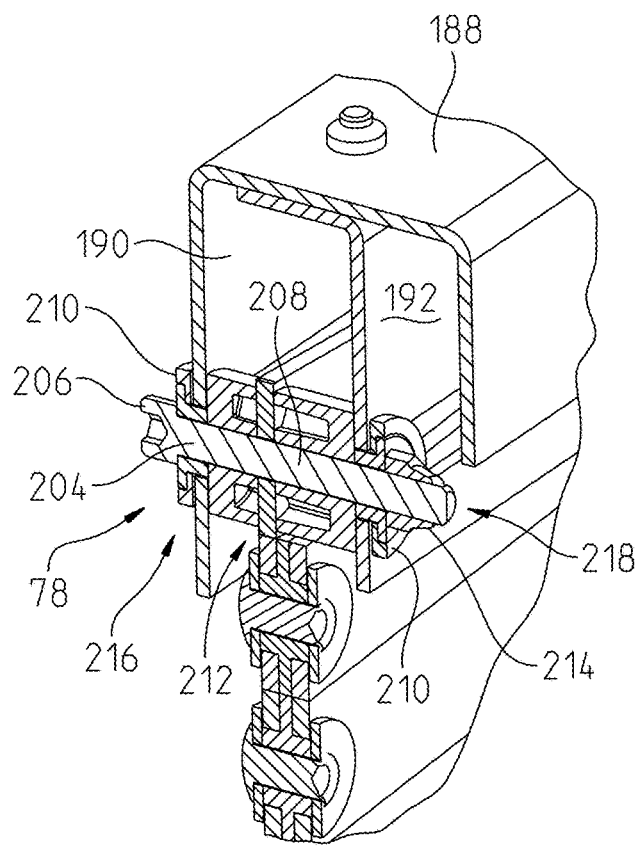
FIG. 12 is a cross-sectional view taken along line 12-12 of FIG. 2 showing the coupling of an upper end of an extendable stabilizer to the ceiling mount.
Figure 13:
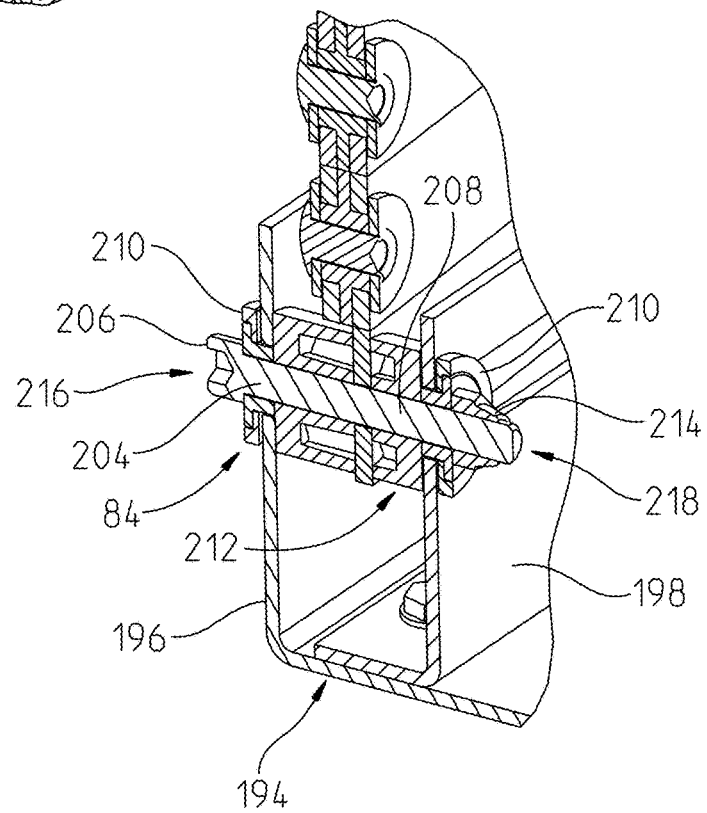
FIG. 13 is a cross-sectional view taken along line 13-13 of FIG. 2 showing the coupling of an lower end of an extendable stabilizer to the projector mount.

As shown in FIGS. 5, 12, and 13 couplers 82, 84 that couple first (and third) stabilizers to projector mount 22 extend through vertical boundary 179 so that portions of couplers 82, 84 are positioned within vertical space 178 and a portion is positioned outside of vertical space 178. Because second stabilizer 112 is inset more than first and third stabilizers 1110, 114, couplers 82, 84 that couple second stabilizer 112 to projector mount 22 are spaced apart from vertical boundary 179 so that all of these couplers 82, 84 are positioned within vertical space 178.

Ceiling mount 20 includes a base 188 having an outer flange 190 and a flange bracket 192 through which couplers 78 extend to couple scissor links 64 of first and third stabilizers 110, 114 to ceiling mount 20 as shown in FIG. 12. Similarly, projector mount 22 includes a base 194 having an outer flange 196 and flange bracket 198 through which couplers 84 extend to couple scissor links 66 of first and second stabilizers 110, 112 to projector mount 22 as shown in FIG. 13. Base 188 of ceiling mount 20 and base 192 of also include inner flanges 200, 202 through which couplers 82, 84 extend to couple scissor links 64, 66 of second stabilizer 112 to respective ceiling and projector mounts 20, 22.

As shown in FIGS. 12 and 13, couplers 78, 84 for first and third stabilizers 110, 114 includes a fastener 204 having a head 206 and a shank 208, a pair of washers 210, a split bushing 212, and a nut 214. First and second ends 216, 218 of couplers 78, 84 are coupled on opposite sides of stabilizers 110, 114 to respective outer flange 190 and flange bracket 192 on ceiling mount 20 and respective outer flange 196 and flange bracket 198 on projector mount 22. As shown in FIGS. 12 and 13, portions of first and third stabilizers 110, 114 are positioned directly between outer flange 190 and flange bracket 192 of ceiling mount 20 and directly between outer flange 196 and flange bracket 198 of projector mount 22. Unlike first and third stabilizers 110, 114, couplers 82, 84 of second stabilizer 112 is not coupled on two ends, but coupled only on one end inner flanges 200, 202 to respective ceiling and projector mounts 20, 22. According to an alternative embodiments, second stabilizer 112 is coupled to ceiling and/or projector mounts 20, 22 in a manner similar to first and second stabilizers so that the couplers are not cantilevered.

Figure 14:
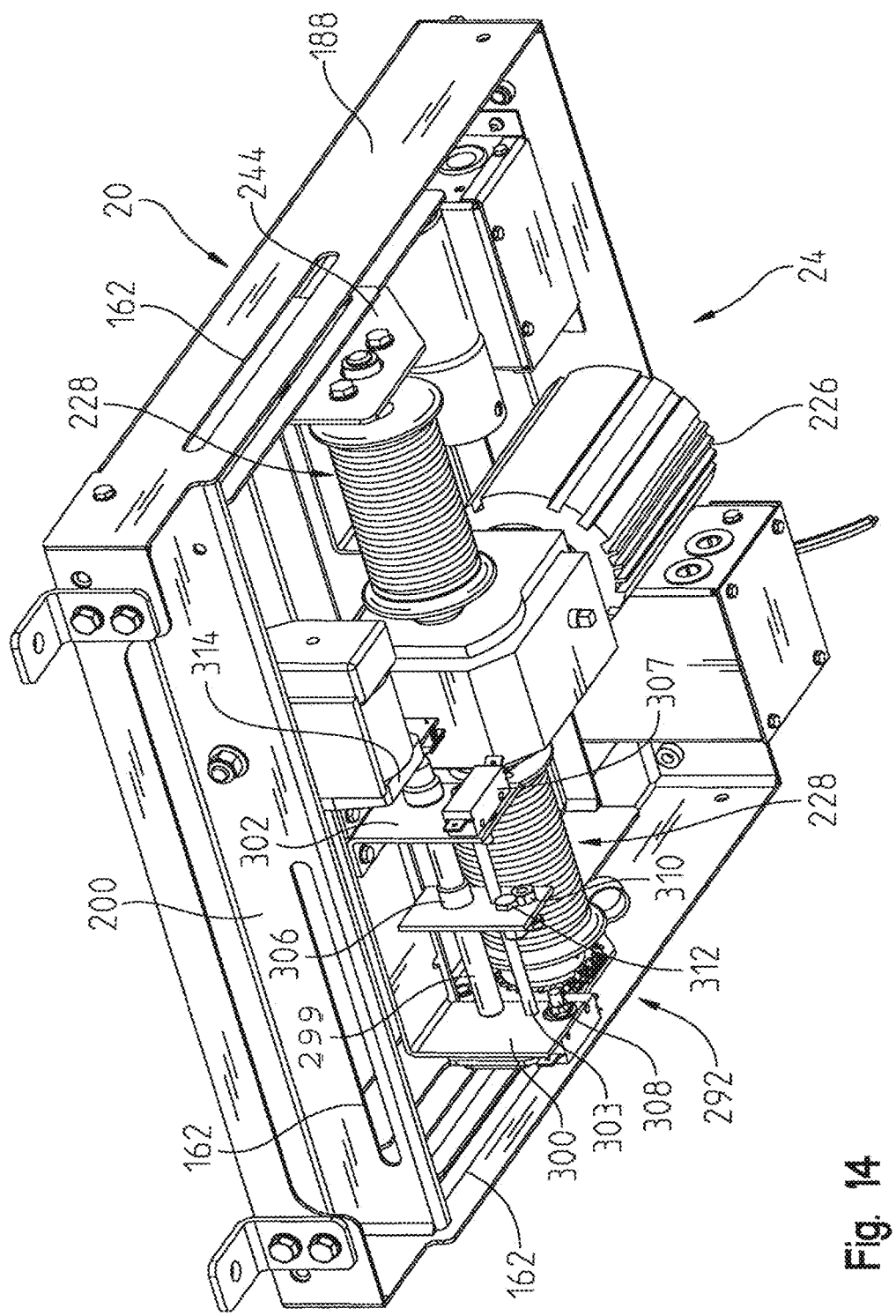
FIG. 14 is a perspective view showing the ceiling mount supporting the lift assembly.

As shown in FIG. 14, lift assembly includes a motor 226, a pair of cable drums 228, and a pair of cables 230 (only portions of cables 230 are shown in some of the figures) extending between cable drums 228 and projector mount 20. Preferably, cables 230 are as near vertical as possible to avoid tilting projector mount 20. As shown in FIG. 10, cable 230 is not vertical, which can result in this undesirable tilting of projector mount 20. One factor that influences the degree to which cable 230 is not vertical is the mounting location of projector 12 on projector mount 22. Preferably, the combined center of gravity of all components supported by cables 230 is centered under cable 230, which will lessen or substantially eliminate any diversion of cable 230 from being vertical. Components of projector lift 14 may be moved relative to one another to facilitate movement of the center of gravity to a position closer to being directly under cables 230.

Figure 9:
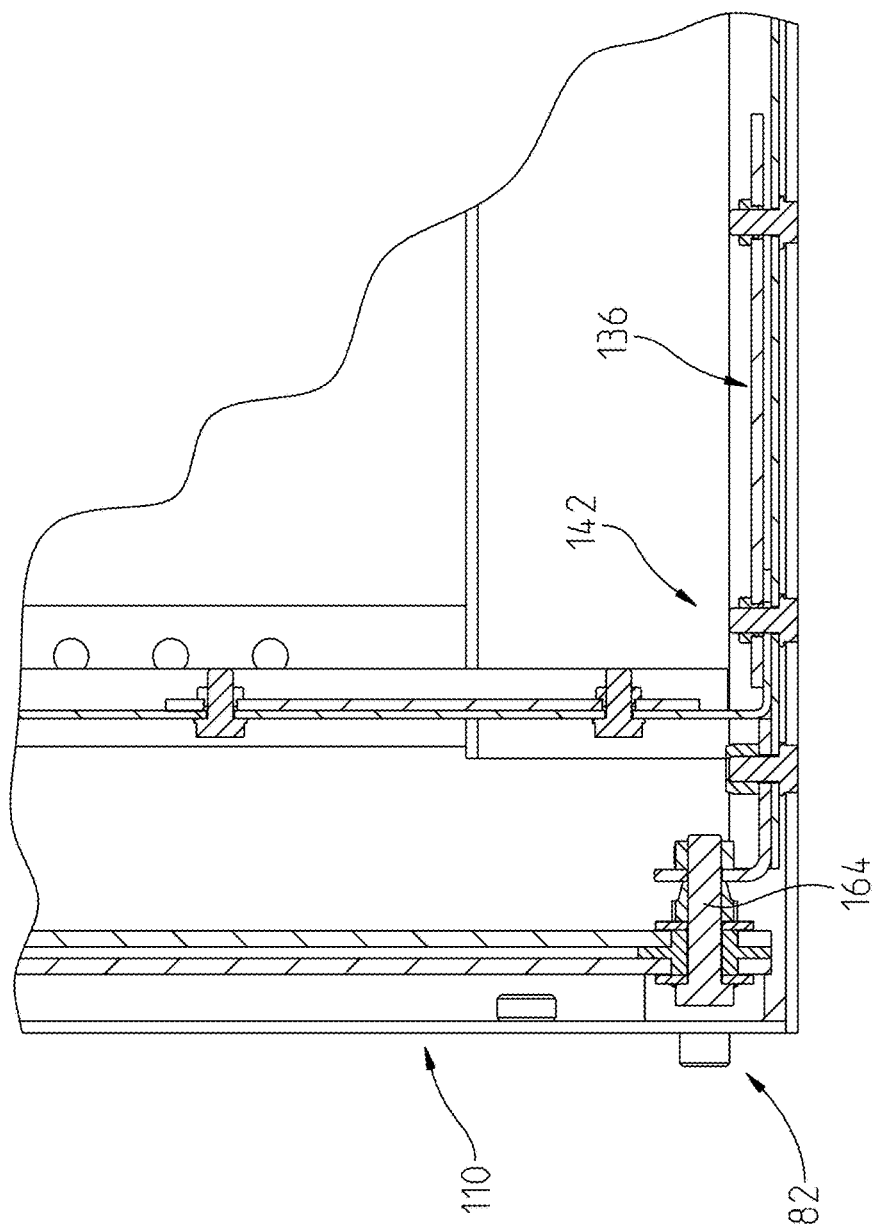
FIG. 9 is another enlarged view of a portion of FIG. 7.
Figure 11:
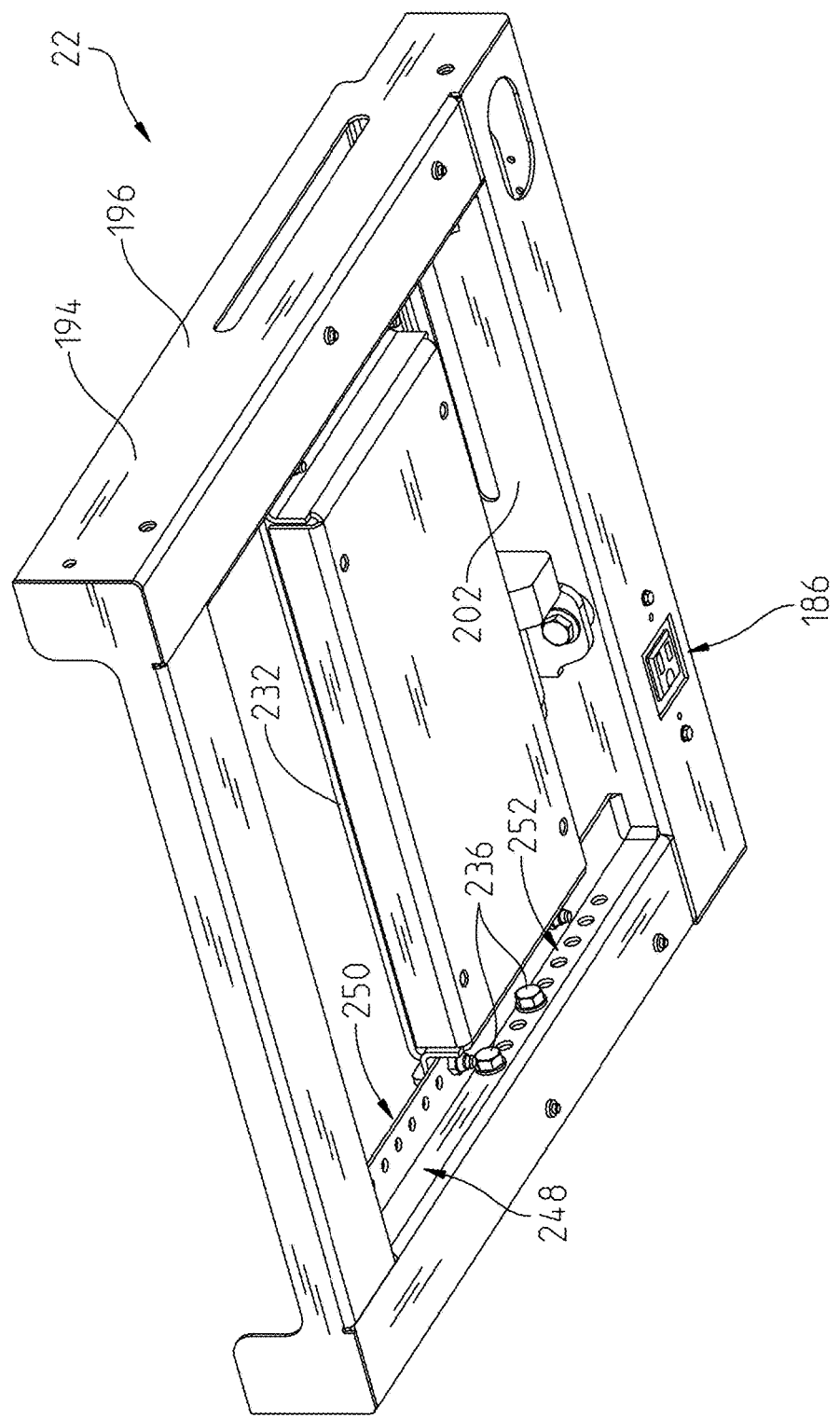
FIG. 11 is a perspective view of the projector mount showing the projector mount including an electrical outlet.

As shown in FIG. 6, projector mount 22 includes a base support member 232 coupled to cables 230 by cable connectors 234 and to base 194 by fasteners 236 as shown in FIGS. 7, 9, and 11. Projector mount 22 further includes a projector support member 238 coupled to projector 12 by fasteners 242 as shown in FIG. 10 and coupled to base 194 by fasteners 240 as shown in FIG. 11. Similarly, ceiling mount 20 includes a lift assembly support member 244 coupled to base 188 of ceiling mount 20 by fasteners 246 as shown in FIG. 10.

Each of base support member 232, projector support member 238, and lift assembly support member 244 can be shifted front and back relative to their respective bases 188, 194 to adjust the position of components relative to cables 230 in an effort to better center the center of gravity of the component supported by cables 230 directly under cables 230.

Figure 4:
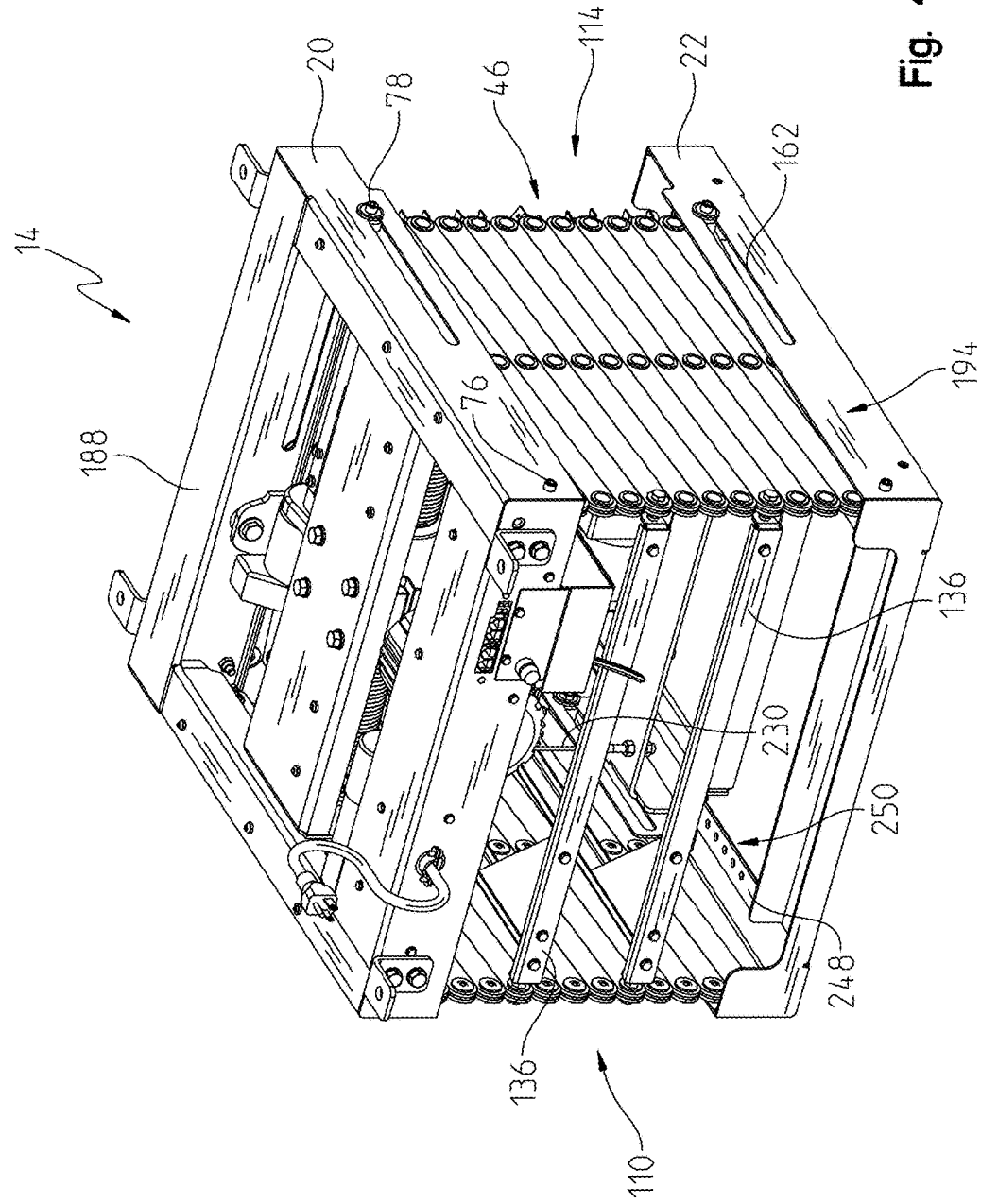
FIG. 4 is another perspective view of the projector lift of FIG. 2.

As shown in FIGS. 4, 10, and 11, base 194 of projector mount 22 includes flanges 248 having a plurality of fastener-receiving apertures 250. To move the center of gravity of projector support member 238 and projector 12 mounted on projector support member 238 forward or aft, an installer selects fastener-receiving apertures 250 that position the center of gravity nearest being under cables 230. Similarly, flanges 248 include another set of fastener receiving apertures 252. To move the center of gravity of base 194, projector support member 238, and projector 12 forward and aft, an installer selects fastener receiving apertures 252 that position the center of gravity nearest being under cables 230. The separation distance between apertures 250 and apertures 252 may be the same or different. When different, as preferred, one set of apertures provides a "gross" adjustment and the other set of apertures provides a "fine" adjustment. As shown in FIG. 10, base 188 includes flange 254 having a plurality of fastener-receiving apertures 256 and slot 258 and a corresponding flange having two slots 258. To move the lift assembly 24 and cable 230 relative to the remainder of lift 14, including ceiling mount 20 and projector mount 22 with projector 12, forward and aft, an installer selects fastener receiving apertures 256 that position the cable 230 in the most vertical orientation. Fasteners 246 in slots 258 need not be removed. According to alternative embodiments, slots, such as slots 258, may also be provided for support members 232, 238.

By moving various components relative to cables 230 to make cables 230 more vertical, horizontal force components applied by cable 230 are reduced. When such horizontal force components are present, first and third stabilizers 110, 114 counter the cables' horizontal force component. This countering may also result in vertical forces applied against stabilizers 110, 112 to counter torque on projector mount 20. Thus, by reducing the horizontal component of force applied by cables 230 to projector mount 20, both horizontal and vertical forces may be reduced in stabilizers 110, 112, 114.

Figure 15:
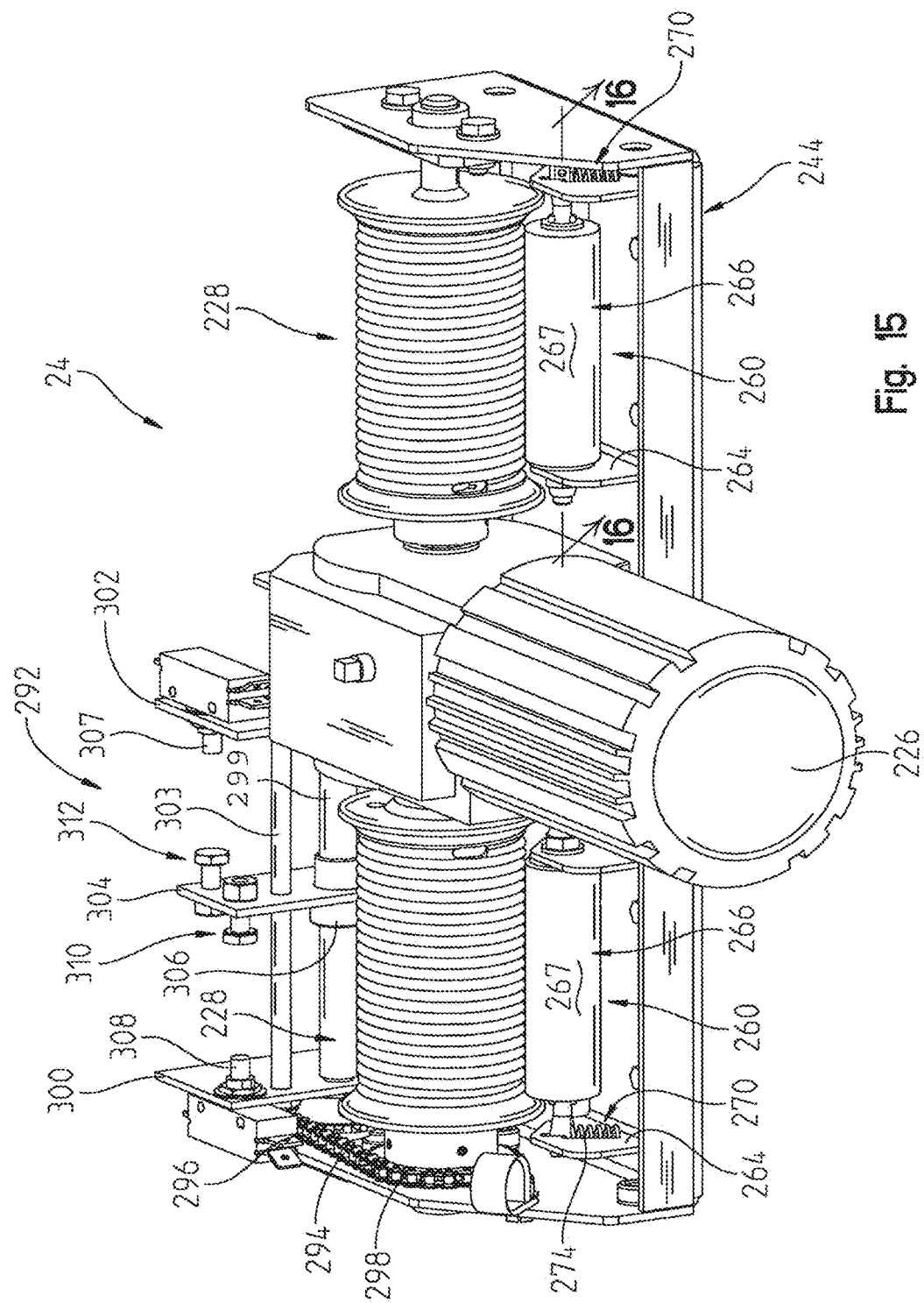
FIG. 15 is a perspective view of the lift assembly.
Figure 16:
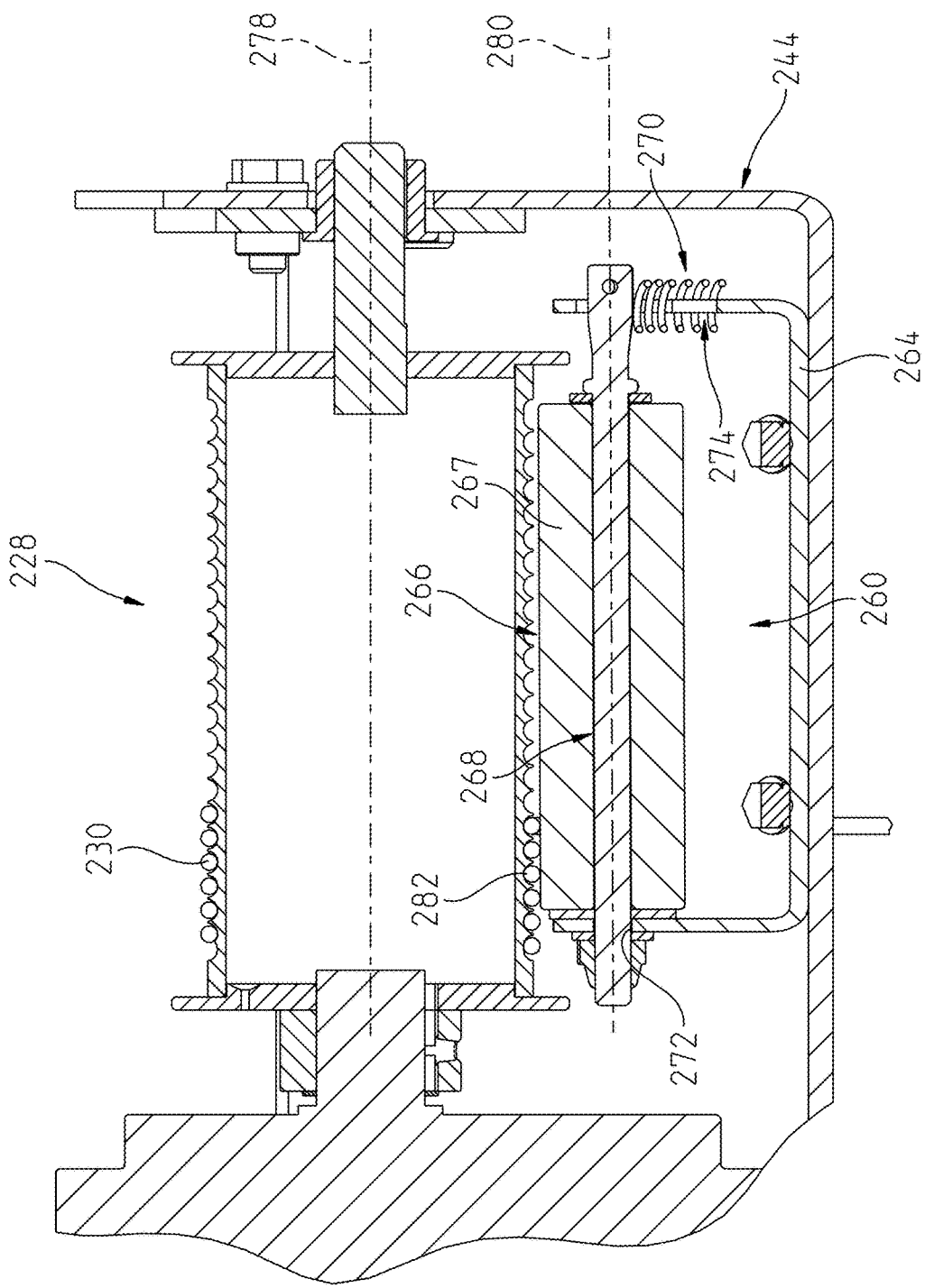
FIG. 16 is a cross-sectional view taken along line 16-16 of FIG. 15 showing a cable guide including a roller guiding the cable onto a roller drum.

As shown in FIGS. 14-16, cables 230 wrap and unwrap around cable drums 228 during lowering and raising of projector 12. Cables 230 provide most, if not all, off the support for projector mount 22. Thus, cables 230 are a preferred form of adjustable length support members. According to other embodiments, other adjustable length support members, such as straps, may be provided.

As shown in FIG. 15, lift assembly 24 further includes cable guides 260 that direct cable 230 into the grooves 262 of cable drums 228. Each cable guide 260 includes a bracket 264, a roller 266 mounted on bracket 264 having a roller body 267 and a shaft 268 mounting roller body 267 on bracket 264, and a spring 270. Bracket 264 includes an aperture 272 that receives one end of shaft 268 and a slot 274 that receives the other end of shaft 268. Spring 270 is positioned in slot 274 and urges first end 276 of roller 266 toward cable drum 228.

Cable drum 228 includes an axis of rotation 278 and roller 266 includes an axis of rotation 280 that is slightly non-parallel to axis of rotation 278 of cable drum 228. Spring 270 urges roller body 267 into contact with cable 230. The non-parallel orientation between axes 278, 280 results in roller body 267 apply most, if not all, of its force to the lead wrap 282 of cable 230. As more and more cable wraps (or unwraps), the location of lead wrap 282 moves back and forth along cable drum 228. As lead wrap 282 moves, spring 270 changes the orientation of axis of rotation 280 and the angle of roller body 267. For example, as more of cable 230 unwraps from cable drum 228 shown in FIG. 16, lead warp 282 moves to the left and spring 270 compresses to allow shaft 268 of roller 266 to slide in slot 274. Meanwhile, the opposite end of shaft 268 of roller 266 pivots slightly in aperture 272. Similarly, as more of cable 230 wraps onto cable drum 228, lead wrap 282 moves to the right and spring 270 urges the contact between roller body 267 and lead wrap 282 to the right so that lead wrap 282 is always receiving most of the force. According to an alternative embodiment, the orientation of roller 266 is fixed by replacing slot 274 with an aperture 272.

Figure 18:
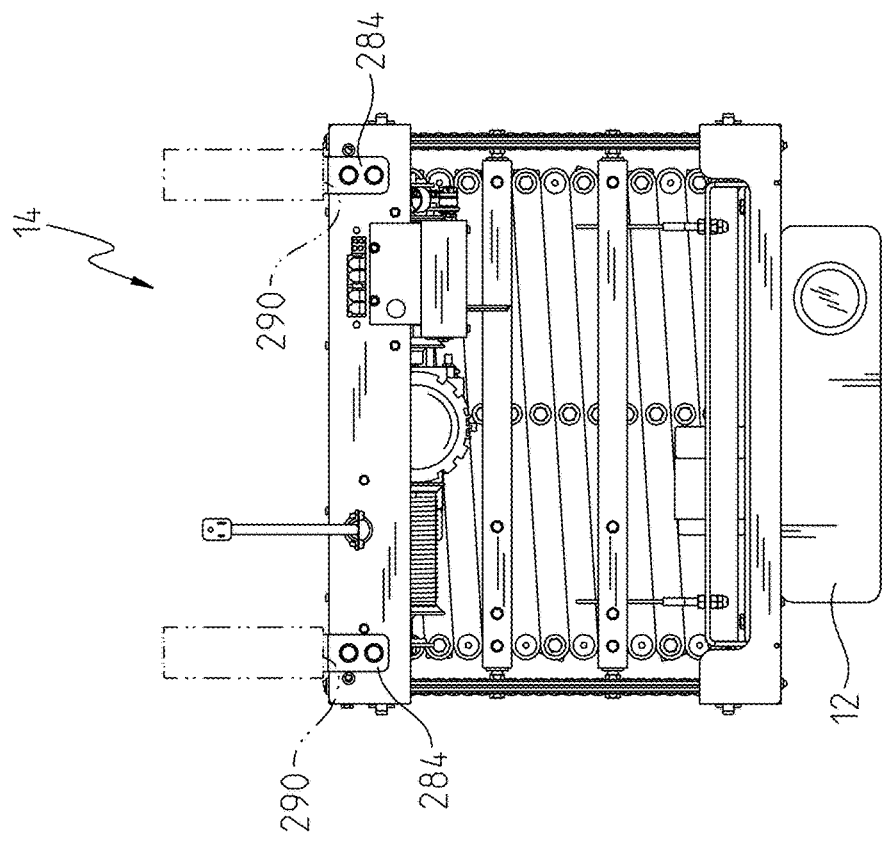
FIG. 18 is a view similar to FIG. 17 showing the projector lift configured to be mounted on a horizontal surface.
Figure 17:
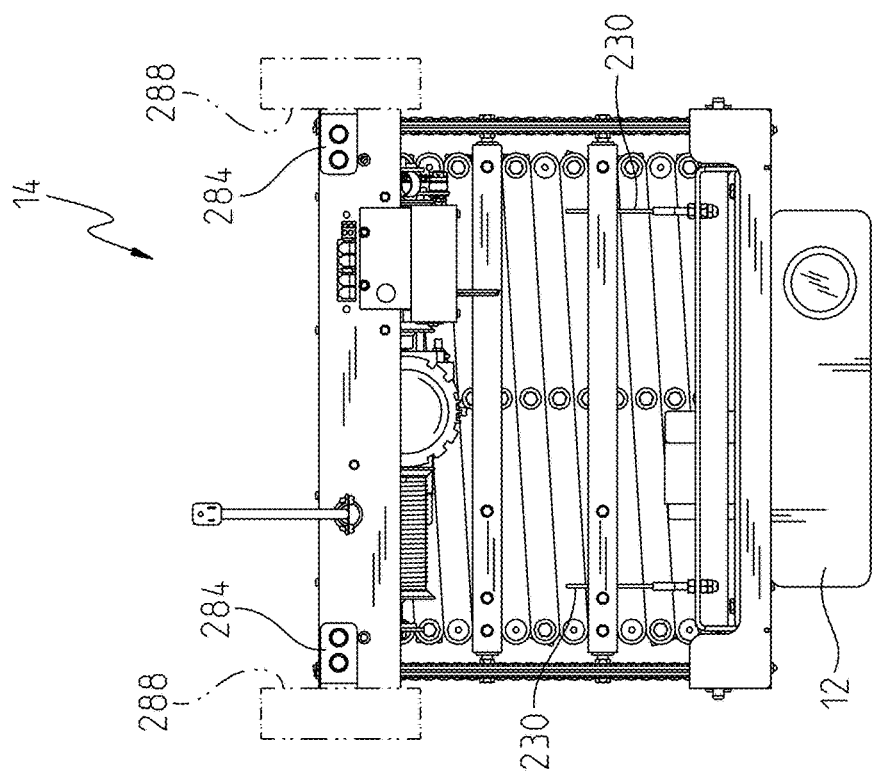
FIG. 17 is a side view of the projector lift of FIG. 2 showing the projector lift configured to be mounted on a vertical surface.

As shown in FIGS. 17 and 18, ceiling mount 20 includes mounting flanges 284 coupled to base 188 by fasteners 286. Flanges 284 can be moved from a vertical orientation for mounting to vertical surfaces 288 as shown in FIG. 17 or to a horizontal orientation for mounting to horizontal surfaces 290 as shown in FIGS. 18 and 2.

As shown in FIGS. 14 and 15, lift assembly 24 includes a position determining assembly 292 the determines how much cable 230 has been wrapped and unwrapped from cable drums 228. Assembly 292 includes a pair of gears 294, 296 and a chain 298 between gears 294, 296. According to an alternative embodiment, gears 294, 296 may be in direct engagement to eliminate the need for chain 298.

Gear 296 drives a threaded shaft 299 mounted between flanges 300, 302. Position plate 304 includes a threaded bushing 306 that rides along threaded shaft 299 depending on the direction of rotation of cable drums 228 by motor 226. Guide shaft 303 prevents position plate 304 from rotating with threaded shaft 299. Assembly 292 includes a pair of limit switches 307, 308. Bolts 310, 312 mounted on position plate 304 strike the respective limit switches 307, 308 to indicate the end of travel of cables 230. To adjust the end of travel, bolts 310, 312 are threaded more or less into position plate 304 so they strike switches 307, 308 sooner or later in the travel of position plate 304.

An encoder 314 is coupled to an end of shaft 299 to detect the rotational position of shaft 299. According to one embodiment, encoder 314 is used to set the end of travel of cables 230.

As mentioned above, projector lift 14 retracts and extends to raise and lower projector 12 between a stored position, a use position, and a service position. As preferred method for establishing the use position is shown in FIG. 19.

During raising and lowering of projector 12, projector mount 22 supporting projector 12 will drift after motor 226 is shut off. The amount of drift depends on friction specific to each projector lift 14, the weight of the various components raised and lowered, including the weight of projector 12, which will differ depending on the size and brand of projector installed.

According to the present disclosure, the amount of drift for each specific projector lift and projector combination is factored into controlling raising and lowering projector 12 to the desired use position.

Figure 19:
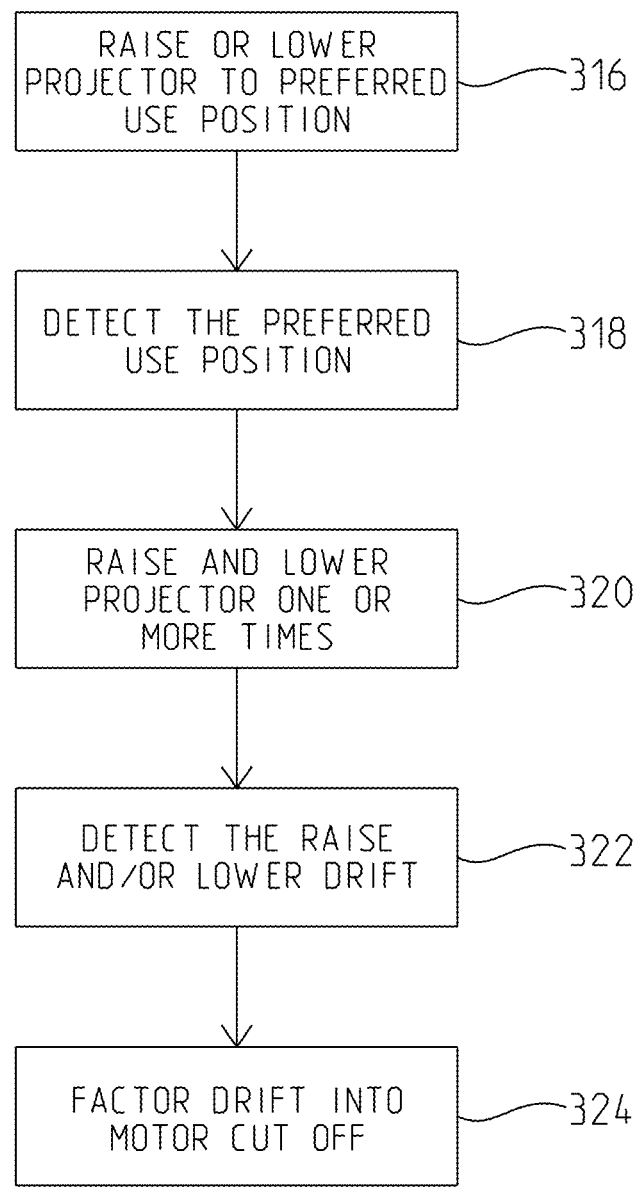
FIG. 19 is a flow chart showing a preferred method of setting the extension length of the lift assembly.

As shown in FIG. 19, initially at step 316, projector 12 is lowered to the desired use position from at which projector 12 projects the image at the desired height onto a projection screen or other surface. While being lowered, encoder 314 counts the number of rotation of shaft 299 to detect how many rotations of shaft 299 are required to lower projector 12 to the desired location at step 318. Encoder 314 communicates with a controller (not shown) that includes a storage medium including instructions to implement the processes described herein.

After storing the determined preferred use position, the controller repeatedly raises and lowers projector 12 in a range around the preferred use position at step 320. Through feedback from encoder 314, the controller determines how much projector 12 drifts after motor 226 is turned off. This determination is made for both drift when projector 12 is being lowered and for drift when project 12 is being raised. Next, the controller factors in the amount of drift into determining when to cut off motor 226 so that projector 12 doesn't overshoot the desired use position at step 324. For example, if the controller determines that shaft 299 needs to rotate 316 times for projector 12 to reach the desired use position and that there are 5.5 rotations of shaft 299 as a result of lowering drift, the controller will cut off motor 226 at 310.5 rotations so that projector 12 drifts down to the desired use position. Similarly, if projector 12 is being raised to the use position, controller will add the number of rotations as a result of raising drift. For example, if 4.0 rotations of shaft 299 as a result of raising drift, the controller with cut off motor 226 at 320 rotations (from the raised position) so that projector 12 drifts up to the desired use position. According to the preferred embodiment, multiple use positions can be programmed into the controller so that projector 12 can be used to project images on any number of projection screens or surfaces in a room that are at different heights. If motor 226 is a stepper motor or other similar speed-controlled motor, the controller can use the drift to determine when to slow down motor 226 as it approaches the desired use position.

According to alternative embodiments of the present disclosure, the lifts of the present disclosure are configured to support other audio/visual components, such as speakers, slide projectors, LCD projectors, receivers, VCR's, DVD players, TV's, or other audio/visual or other components known to those of ordinary skill in the art. Furthermore, according to other alternative embodiments of the present disclosure, the lifts are configured to support components in other locations in a room. For example, according to one alternative embodiment of the present disclosure, the lift is configured to raise a TV from the floor of a room. According to other alternative embodiments of the present disclosure, the lift is configured to move other objects between two positions.

Preferably, instructions for the assembly, installation, and/or use of the devices disclosed herein are provided with said devices or otherwise communicated to permit a person or machine to assemble, install and/or use such devices. Such instructions may include a description of any or all portions of the devices and/or any or all of the above-described assembly, installation, and use of the devices. Furthermore, such instructions may describe the environment in which the devices are used. The instructions may be provided on separate papers and/or the packaging in which the device is sold or shipped. Furthermore, the instructions may be embodied as text, pictures, audio, video, or any other medium or method of communicating instructions known to those of ordinary skill in the art.

Although the present invention has been described in detail with reference to preferred embodiments, variations and modifications exist within the scope and spirit of the present invention as described and defined in the following claims.

The invention claimed is:

1. A projector lift adapted to support a projector from a ceiling, the projector lift comprising:
    a ceiling mount adapted to be coupled to the ceiling of a room,
    a projector mount adapted to support the projector,
    a first scissor link series, including a top end and a bottom end, extending between the ceiling mount and the projector mount, wherein the top end is coupled to the ceiling mount, and the bottom end is coupled to the projector mount, the first scissor link series including at least two scissor link pairs,
        wherein a first scissor link pair of said at least two scissor link pairs of the first scissor link series includes a first lower end and a second lower end and a second scissor link pair of said at least two scissor link pairs of the first scissor link series includes a first upper end and a second upper end, wherein the first scissor link pair of said at least two scissor link pairs of the first scissor link series and the second scissor link pair of said at least two scissor link pairs of the first scissor link series are coupled at a first joint at the first lower end of said first scissor link pair and the first upper end of said second scissor link pair and at a second joint at the second lower end of said first scissor link pair and the second upper end of said second scissor link pair;
    a second scissor link series, including a top end and a bottom end, extending between the ceiling mount and the projector mount, wherein the top end is coupled to the ceiling mount and the bottom end is coupled to the projector mount, the second scissor link series including at least two scissor link pairs,
        wherein a first scissor link pair of said at least two scissor link pairs of the second scissor link series includes a first lower end and a second lower end and a second scissor link pair of said at least two scissor link pairs of the second scissor link series includes a first upper end and a second upper end, wherein the first scissor link pair of said at least two scissor link pairs of the second scissor link series and the second scissor link pair of said at least two scissor link pairs of the second scissor link series are coupled at a first joint at the first lower end of said first scissor link pair of said at least two scissor link pairs of the second scissor link series and the first upper end of said second scissor link pair of said at least two scissor link pairs of the second scissor link series and at a second joint at the second lower end of said first scissor link pair of said at least two scissor link pairs of the second scissor link series and the second upper end of said second scissor link pair of said at least two scissor link pairs of the second scissor link series,
    the second scissor link series being substantially non-parallel to the first scissor link series, and arranged such that the second joint of the at least two scissor link pairs of the first scissor link series is substantially orthogonal to the first joint of the at least two scissor link pairs of the second scissor link series; and
    at least one link extending between the first joint of the at least two scissor link pairs of the first scissor link series and the second joint of the at least two scissor link pairs of the second scissor link series, wherein the at least one link is coupled to the first joint of the at least two scissor link pairs of the first scissor link series and the second joint of the at least two scissor link pairs of the second scissor link series.

2. The projector lift of claim 1, wherein at least a portion of the at least one link is substantially parallel to the first scissor link series.

3. The projector lift of claim 1, wherein at least a first portion of the at least one link is substantially non-parallel to the second scissor link series.

4. The projector lift of claim 3, wherein at least a second portion of the at least one link is substantially parallel to the first scissor link series.

5. The projector lift of claim 1, wherein at least one end of the first scissor link series is configured to move in a first horizontal direction during extension and retraction, a first end of the at least one link has a first horizontal position along the first horizontal direction when the first scissor link series is fully retracted and the first end of the at least one link has a second horizontal position along the first horizontal direction when the first scissor link series is fully extended that is substantially the same as the first horizontal position.

6. The projector lift of claim 5, wherein at least one end of the second scissor link series is configured to move in a second horizontal direction during extension and retraction, a second end of the at least one link has a third horizontal position along the second horizontal direction when the second scissor link series is fully retracted and the second end of the at least one link has a fourth horizontal position along the second horizontal direction when the second scissor link series is fully extended that is substantially the same as the third horizontal position.

7. The projector lift of claim 6, wherein the second horizontal direction is substantially perpendicular to the first horizontal direction.

8. The projector lift of claim 1, wherein the first and second scissor link series cooperate to define an approximate L-shape having a first leg, a second leg, and a corner.

9. The projector lift of claim 8, wherein at least a portion of the at least one link extends from the corner of the L-shape to a terminal end of at least one of the first and second legs of the L-shape.

10. The projector lift of claim 8, wherein at least a portion of the at least one link extends from a terminal end of the first leg of the L-shape to a terminal end of the second leg of the L-shape.

11. A projector lift adapted to support a projector from a ceiling, the projector lift comprising:
   a ceiling mount adapted to be coupled to the ceiling of a room;
   a projector mount adapted to support the projector;
   a first scissor link series, including a top portion, a bottom portion, a first end and a second end, extending between the ceiling mount and the projector mount, wherein the top portion is coupled to the ceiling mount, and the bottom portion is coupled to the projector mount;
   a second scissor link series, including a top portion, a bottom portion, a first end and a second end, extending between the ceiling mount and the projector mount, wherein the top portion is coupled to the ceiling mount, and the bottom portion is coupled to the projector mount; and
   at least one leg of at least one link extending longitudinally from the first scissor link series to the second scissor link series in a direction substantially parallel to the first scissor link series, wherein the at least one link is directly coupled to at least one end of the first scissor link series and at least one end of the second scissor link series and positioned inboard of the first scissor link series.

12. The projector lift of claim 11, wherein the at least one lea of the at least one link extends between the first and second scissor link series in a direction substantially non-parallel to the second scissor link series.

13. The projector lift of claim 11, wherein the first scissor link series includes a scissor link cooperating with the at least one link to define an angle therebetween, the angle changes during extension and retraction of the first scissor link series.

14. The projector lift of claim 11, wherein the first and second scissor link series cooperate to define an approximate L-shape having a first leg, a second leg, and a corner.

15. The projector lift of claim 14, wherein the at least one link extends from the corner of the L-shape to a terminal end of at least one of the first and second legs of the L-shape.

16. A projector lift adapted to support a projector from a ceiling, the projector lift comprising:
   a ceiling mount adapted to be coupled to the ceiling of a room,
   a projector mount adapted to support the projector,
   at least two scissor link series extending between the ceiling mount and the projector mount, a first scissor link series of the at least two scissor link series including a top portion and a bottom portion, extending between the ceiling mount and the projector mount, wherein the top portion is coupled to the ceiling mount, and the bottom portion is coupled to the projector mount, the first scissor link series including at least two scissor link pairs, wherein a first scissor link pair of the at least two scissor link pairs of the first scissor link series includes a first lower end and a second lower end and a second scissor link pair of the at least two scissor link pairs of the first scissor link series includes a first upper end and a second upper end, wherein the first scissor link pair of the at least two scissor link pairs of the first scissor link series and the second scissor link pair of the at least two scissor link pairs of the first scissor link series are coupled at a first joint at the first lower end of the first scissor link pair of the at least two scissor link pairs of the first scissor link series and the first upper end of the second scissor link pair of the at least two scissor link pairs of the first scissor link series and at a second joint at the second lower end of the first scissor link pair of the at least two scissor link pairs of the first scissor link series and the second upper end of the first scissor link pair of the at least two scissor link pairs of the first scissor link series and at least one of the at least two scissor link pairs of the first scissor link pair of the first scissor link series has a first scissor link and a second scissor link coupled to the first scissor link to pivot about a pivot axis relative to the first scissor link,
   a second scissor link series of the at least two scissor link series, including a top portion and a bottom portion, extending between the ceiling mount and the projector mount, wherein the top portion is coupled to the ceiling mount and the bottom portion is coupled to the projector mount,
   the second scissor link series including at least two scissor link pairs, wherein a first scissor link pair of the at least two scissor link pairs of the second scissor link series includes at least a first lower end and a second lower end and a second scissor link pair of the at least two scissor link pairs of the second scissor link series includes at least a first upper end and a second upper end, wherein the first scissor link pair of the at least two scissor link pairs of the second scissor link series and the second scissor link pair of the at least two scissor link pairs of the second scissor link series are coupled at a first joint at the first lower end of the first scissor link pair of the at least two scissor link pairs of the second scissor link series and the first upper end of the second scissor link pair of the at least two scissor link pairs of the second scissor link series and at a second joint at the second lower end of the first scissor link pair of the at least two scissor link pairs of the second scissor link series and the second upper end of the second scissor link pair of the at least two scissor link pairs of the second scissor link series, the second scissor link series being substantially non-parallel to the first scissor link series, and arranged such that the second joint of the at least two scissor link pairs of the first scissor link series is substantially orthogonal to the first joint of the at least two scissor link pairs of the second scissor link series and
   at least one link rotatably coupled to the first joint of the at least two scissor link pairs of the first scissor link series and the second joint of the at least two scissor link airs of the second scissor link series to permit rotation of the at least two scissor link pairs of the first scissor link series relative to the at least one link about an axis of rotation that is substantially non-parallel to the pivot axis.

17. The projector lift of claim 16, wherein the axis of rotation is substantially perpendicular to the pivot axis.

18. The projector lift of claim 16, wherein the at least one link permits rotation of the at least two scissor link pairs of the first scissor link series relative to the at least one link about another axis of rotation that is substantially parallel to the pivot axis.

19. A projector lift adapted to support a projector from a ceiling, the projector lift comprising:
   a ceiling mount adapted to be coupled to the ceiling of a room,
   a projector mount adapted to support the projector,
   a first scissor link series extending between the ceiling mount and the projector mount, wherein the first scissor link series includes a top portion coupled to the ceiling mount, a bottom portion coupled to the projector mount, a first end including at least one first joint coupling two scissor link pairs of the first scissor link series and a second end including at least one second joint coupling the two scissor link pairs of the first scissor link series,
   a second scissor link series extending between the ceiling mount and the projector mount, wherein the second scissor link series includes a top portion coupled to the ceiling mount, a bottom portion coupled to the projector mount, a first end including at least one first joint coupling two scissor link pairs of the second scissor link series and a second end including at least one second joint coupling the two scissor link pairs of the second scissor link series,
   a third scissor link series extending between the ceiling mount and the projector mount, wherein the third scissor link series includes a top portion coupled to the ceiling mount, a bottom portion coupled to the projector mount, a first end including at least one first joint coupling two scissor link pairs of the third scissor link series and a second end including at least one second joint coupling the two scissor link pairs of the third scissor link series, and
   at least one link extending between the first scissor link series, the second scissor link series, and the third scissor link series, wherein the at least one link is directly coupled at the at least one of the first and the second joints of each of the first, second and third scissor link series.

20. The projector lift of claim 19, wherein the first and second scissor link series cooperate to define an L-shape.

21. The projector lift of claim 19, wherein the first and third scissor link series are substantially parallel.

22. The projector lift of claim 19, wherein the at least one link is L-shaped.

23. The projector lift of claim 19, wherein the at least one link includes a leg that is substantially parallel to the first scissor link series.

24. The projector lift of claim 23, wherein the at least one link further includes a leg that is substantially perpendicular to the first scissor link series.

25. A projector lift adapted to support a projector from a ceiling, the projector lift comprising:
   a ceiling mount adapted to be coupled to the ceiling of a room,
   a projector mount adapted to support the projector,
   a first scissor link series extending between the ceiling mount and the projector mount, wherein the first scissor link series includes a top portion coupled to the ceiling mount, a bottom portion coupled to the projector mount, a first end including at least one first joint coupling two scissor link pairs of the first scissor link series and a second end including at least one second joint coupling the two scissor link pairs of the first scissor link series,
   a second scissor link series extending between the ceiling mount and the projector mount, wherein the second scissor link series includes a top portion coupled to the ceiling mount, a bottom portion coupled to the projector mount, a first end including at least one first joint coupling two scissor link pairs of the second scissor link series and a second end including at least one second joint coupling the two scissor link pairs of the second scissor link series, and
   at least one link having first and second legs, at least one of the first and second legs extending between the first and second scissor link series, wherein the at least one link is directly coupled to at least one of the first and second joints of both the first and second scissor link series and at least one of the first and second legs of the at least one link extends from the at least one first joint of the first end to the at least one-second joint of the second end of at least one of the first and second scissor link series.

26. The projector lift of claim 25, wherein the first leg is substantially parallel to the first scissor link series.

27. The projector lift of claim 26, wherein the first leg is substantially perpendicular to the second scissor link series.

28. A projector lift adapted to support a projector from a ceiling, the projector lift comprising:
   a ceiling mount adapted to be coupled to the ceiling of a room, a projector mount adapted to support the projector,
   a first scissor link series extending between the ceiling mount and the projector mount, wherein the first scissor link series includes a top portion coupled to the ceiling mount, a bottom portion coupled to the projector mount, a first end including at least one first joint coupling two scissor link pairs of the first scissor link series and a second end including at least one second joint coupling the two scissor link pairs of the first scissor link series,
   a second scissor link series extending between the ceiling mount and the projector mount, wherein the second scissor link series includes a top portion coupled to the ceiling mount, a bottom portion coupled to the projector mount, a first end including at least one first joint coupling two scissor link pairs of the second scissor link series and a second end including at least one second joint coupling the two scissor link pairs of the second scissor link series, and
   at least one link having first and second legs, at least one of the first and second legs extending between the first and second scissor link series, wherein the at least one link is directly coupled to at least one of the first and second joints of both the first and second scissor link series and extends from the first end to the second end of at least one of the first and second scissor link series, wherein the first leg is pivotably coupled to the first scissor link series to permit the first scissor link series to pivot about a first pivot axis and the second leg is pivotably coupled to the second scissor link series to permit the second scissor link series to pivot about a second pivot axis that is substantially nonparallel to the first pivot axis.

29. A projector lift adapted to support a projector from a ceiling, the projector lift comprising:

a ceiling mount adapted to be coupled to the ceiling of a room, a projector mount adapted to support the projector, a first scissor link series extending between the ceiling mount and the projector mount, wherein the first scissor link series includes a top portion coupled to the ceiling mount, a bottom portion coupled to the projector mount, a first end including at least one first joint coupling two scissor link pairs of the first scissor link series and a second end including at least one second joint coupling the two scissor link pairs of the first scissor link series, a second scissor link series extending between the ceiling mount and the projector mount, wherein the second scissor link series includes a top portion coupled to the ceiling mount, a bottom portion coupled to the projector mount, a first end including at least one first joint coupling two scissor link pairs of the second scissor link series and a second end including at least one second joint coupling the two scissor link pairs of the second scissor link series, a third scissor link series extending between the ceiling mount and the projector mount, the first leg extends between the first and second scissor link series and the second leg extends between the first and third scissor link series, and at least one link having first and second legs, at least one of the first and second legs extending between the first and second scissor link series, wherein the at least one link is directly coupled to at least one of the first and second joints of both the first and second scissor link series and extends from the first end to the second end of at least one of the first and second scissor link series.

* * * * *

UNITED STATES PATENT AND TRADEMARK OFFICE
CERTIFICATE OF CORRECTION

| | |
|---|---|
| PATENT NO. | : 9,670,039 B1 |
| APPLICATION NO. | : 13/487998 |
| DATED | : June 6, 2017 |
| INVENTOR(S) | : Steven E. Enochs |

It is certified that error appears in the above-identified patent and that said Letters Patent is hereby corrected as shown below:

In the Claims

In Claim 12, Column 11, Line 41, replace the word "lea" with the word "leg".

In Claim 16, Column 12, Line 61, replace the word "airs" with the word "pairs".

Signed and Sealed this
First Day of August, 2017

Joseph Matal
*Performing the Functions and Duties of the
Under Secretary of Commerce for Intellectual Property and
Director of the United States Patent and Trademark Office*